(12) United States Patent
Tamura et al.

(10) Patent No.: US 6,806,978 B1
(45) Date of Patent: Oct. 19, 2004

(54) IMAGE PICK-UP PRINTING APPARATUS

(75) Inventors: Tomoaki Tamura, Hachioji (JP);
Tadaaki Yoneda, Hachioji (JP);
Masafumi Mizukami, Hachioji (JP);
Yasushi Hoshino, Hachioji (JP);
Hiroshi Ushiyama, Hachioji (JP);
Yukinori Koizumi, Hachioji (JP);
Nobuyasu Furutani, Hachioji (JP);
Hideki Ogasawara, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/565,368

(22) Filed: May 5, 2000

(30) Foreign Application Priority Data

May 14, 1999 (JP) .......................................... 11/134123
Aug. 26, 1999 (JP) .......................................... 11/239576

(51) Int. Cl.[7] ........................ H04N 5/225; G06K 15/02
(52) U.S. Cl. .................... 358/1.15; 348/207.2; 348/552; 358/296; 358/302
(58) Field of Search ................. 358/1.1–1.9, 1.11–1.18, 358/296, 302; 396/7, 20, 25–30, 297, 341, 348, 353, 354, 360, 429; 348/207.1, 207.2, 552

(56) References Cited

U.S. PATENT DOCUMENTS 4,937,676 A * 6/1990 Finelli et al. ................ 348/375
6,111,605 A * 8/2000 Suzuki ..................... 348/220.1

* cited by examiner

Primary Examiner—King Y. Poon
(74) Attorney, Agent, or Firm—Cantor Colburn LLP

(57) ABSTRACT

An image capturing and printing apparatus, is provided with an electronic camera section having an image capturing device for photographic a object image to be photographed so as to convert the photographed object image into image signals; a printing section structured so as to be detachably attached to the electric camera section and having a printer for conducting printing based on the image signals received from the electronic camera section; and the electronic camera section having an engaging section adapted to mechanically engages with the printing section, and a connecting section adapted to electronically connect with the printing section.

32 Claims, 21 Drawing Sheets

FIG. 9 (a)

| CONNECTED EQUIPMENT | IMAGE FORMAT | IMAGE PROCESSING | U I |
|---|---|---|---|
| PRINTER A | RGB | • EDGE ENHANCEMENT (STRONG)<br>• COLOR MATCHING A | PRINTER |
| PRINTER B | YUV | • EDGE ENHANCEMENT (STRONG)<br>• COLOR MATCHING B | PRINTER |
| PC | JPEG | • NO EDGE ENHANCEMENT<br>• NO COLOR MATCHING | CAN NOT USE (REMOTE) |
| NONE | Exif, AND OTHERS<br>MEMORY CARD COMPRESSION FORMAT<br>(MEMORY CARD RECORD) | • NO EDGE ENHANCEMENT<br>• NO COLOR MATCHING | DIGITAL CAMERA |

FIG. 9 (b)

| CONNECTED EQUIPMENT | IMAGE FORMAT | IMAGE PROCESSING | NUMBER OF PIXELS |
|---|---|---|---|
| CAMERA A | • YUV<br>• 4:2:0 RAW TYPE<br>• YYYYUV ORDER | • EDGE ENHANCEMENT (MIDDLE) | 1280×960 |
| CAMERA B | • YUV<br>• 4:2:2 RAW TYPE<br>• YYUV ORDER | • EDGE ENHANCEMENT (WEAK)<br>• RE-SIZE INTERPOLATION A | 1600×1200 |
| FLAT BED SCANNER | • RGB<br>• 4:2:4 Bit Map TYPE<br>• COMPONENT INTERLEAVE | • NO EDGE ENHANCEMENT<br>• RE-SIZE INTERPOLATION B<br>• MEDIAN FILTER PROCESSING | 3000×2000 ×3 |

IMAGE PICK-UP PRINTING APPARATUS

BACKGROUND OF THE INVENTION

The present invention relates to a print producing apparatus, an image displaying apparatus and an image capturing and printing apparatus having both of a function of electronic camera and a function of printer.

In company with the advance of electronic technology, an electronic camera such as a digital still camera, by which the captured image is converted into the digital data and stored therein, is developed, and comes into the market already. Because the user can display the image photographed by the digital still camera on a display of user's personal computer, and further, can print the image by using a printer, its application range becomes wide.

Incidentally, because the conventional printer has comparatively large size, it is installed in a room and used there. Further, an image signal obtained by the digital still camera is inputted into the printer through a cable or a recording medium such as a memory card.

Accordingly, when a print according to an image signal obtained by photographing, for example, at the out door is desired, it is necessary to bring the digital still camera or the recording medium to a place in which the printer is installed, and to input the image signal into the printer, and which is inconvenient. Further, when the other person is photographed as the photographic object at a trip or the like the image can be viewed by using a display equipped to the digital still camera at the place where photographing is conducted, however, when it is desired to give this image to the other person who is the photographic object, it is necessary to go home once and print the image, and after that, to send the printed image to the other person by means of a mail or the like, therefore, it takes a trouble and time.

On the one hand, because a printer whose weight is so light as portable has been already developed, it can also be considered that such the printer and the digital still camera are integrated. However, even when the printer is portable, because it is larger and heavier as compared to the digital still camera, when these are integrated, there is a possibility that the characteristic of the digital still camera that the portability is excellent, is lost.

SUMMARY OF THE INVENTION

In view of the foregoing problems of the conventional technology, the first object of the present invention is to provide an image capturing and printing apparatus which can easily print an image without depending on the photographing place while securing the portability of the electronic camera.

Further, ordinary, a liquid crystal display is installed in the digital still camera, and by viewing the image displayed on the liquid crystal display, the user can confirm the captured image.

Incidentally, generally, the digital still camera has a compact body for the convenience of taking a snapshot of a photographic object, for example, during a trip. When the body of the digital still camera is compact, it is inevitable to reduce a size of the liquid crystal display. However, when the size of the liquid crystal display is reduced, the image displayed on it becomes small, and there is a problem that the image is hardly confirmed.

Further, as the information necessary for the print, there is the color management information including the color conversion table, however, because this is the proper data to each of kinds of products of the digital still camera, when the image is printed, it is necessary to input the data to the printer by some methods.

Further, it is also considered that the digital still camera is directly connected to the printer without through the personal computer, and the image data is transmitted from the digital still camera to the printer, and is printed. However, because its structure and operation are comparatively complicated, a printer whose cost is low and whose operation is easy, is desired.

In view of these problems of the conventional technology, the second object of the present invention is to provide a display apparatus on which the image can be easily confirmed, and a print producing apparatus whose operation is easy.

Hereinafter, preferable structure to attain the fist object will be explained.

(1-1) An image capturing and printing apparatus comprises: an electronic camera section having an image pick-up means for photographing a photographic object image and converting it into an image signal; a print section, which is detachably installed in the electronic camera section, having a printing means for printing according to the image signal received from the electronic camera section, and the electronic camera section has: an engagement section which mechanically engages with the print section; and a connector section which is electrically connected to the print section. With this image capturing and printing apparatus, when the electronic camera section is connected to the print section, the photographic object image photographed by, for example, the electronic camera section can be printed by the print section at the place, and on the one hand, when the electronic camera section is separated from the print section, because the photographing can be carried out by using only the electronic camera section, the portability is excellent.

(1-2) An image capturing and printing apparatus comprises: an electronic camera section having an image pick-up means for photographing a photographic object image and converting it into an image signal; a print section, which is detachably installed in the electronic camera section, having a printing means for printing according to the image signal received from the electronic camera section, and the second release means, and the electronic camera section has: an engagement section which mechanically engages with the print section; and a connector section which is electrically connected to the print section, and the print section has: a receiving section which engages with the engagement section of the electronic camera section; a connector section which is electrically connected to the connector section of the electronic camera section; and the image pick-up means start the photographing corresponding to the start signal from the second release means.

An LCD to display the image is one of large factors to determine the size of the present electronic camera, and when the LCD by which the image quality can be exactly confirmed, is equipped, it is necessary that the surface area of the electronic camera is secured for at least the LCD. On the other hand, when the size of the electronic camera is thought much of, and a small LCD is equipped, the LCD image size can not be secured sufficiently, and the image quality of the print image can not be exactly confirmed.

Further, when LCDs are equipped on both the print section and the electronic camera section, the cost of the product is increased, and the image capturing and printing apparatus would have the expensive structure.

Further, when, for example, only the electronic camera section is used alone, the release is necessary in the electronic camera section, and on the one hand, for example, when the LCD is not provided in the electronic camera section, and the LCD is provided in the print section, the case where the releasing can be conducted on the printer side while the image plane is being confirmed on the LCD of the print section, can provide the more user friendly photographing operation.

As described above, because the shutter releasing can be conducted by one or both of the first release means of the electronic camera section and the second release means of the print section, there is no problem of the parallax of the optical viewfinder, the desired photographic object image can be exactly photographed by the user friendly operation, and the print image of the captured image can be confirmed before the print.

(1-3) Further, in the image capturing and printing apparatus of (1-2), when the system is structured such that, when one of the first release means and the second release means outputs the start signal, the image pick-up means is not operated correspond to the start signal of the other release means for at least a predetermined period of time, then, when the photographing, and printing operation, as the case may be, are conducted by the one release means, the possibility that unnecessary operation is caused carelessly by the operation of the other release means, is suppressed, and the release confliction due to dual release operations can be prevented.

(1-4) Further, in the image capturing and printing apparatus of (1-2) or (1-3), when the system is structured such that the image pick-up means is not operated corresponding to the start signal from both of the first release means and the second release means while the printing means is operated, the incomplete printing according to the excess of the power consumption such as in the case where the photographing operation is started in addition to the printing operation, is prevented, or it can be prevented that a bad influence of noise from the printing means, or the like, affects on the image pick-up means.

(1-5) Further, in the image capturing and printing apparatus of one of (1-1) to (1-4), in the case where the system is structured such that, when the electronic camera section is electrically connected to the print section through the connector section, the image pick-up means is operated corresponding to the start signal from one of the first release means and the second release means, the release confliction due to dual release operations can be prevented. (1-6) Further, in the image capturing and printing apparatus of one of (1-1) to (1-5), when a selection means for selecting any one of the first release means and the second release means and for transmitting the start signal from the selected release means to the image pick-up means, is provided, because the photographing can be conducted corresponding to only the start signal of the release means by an intentional operation, it is convenient.

(1-7) An image capturing and printing apparatus comprises: an electronic camera section having an image pick-up means for photographing a photographic object image and converting it into an image signal, and the storage means, which is detachably installed in the electronic camera section, for storing the image signal received from the electronic camera section; and a print section having a printing means for printing according to the image signal, and the electronic camera section has: an engagement section which mechanically engages with the print section, and a connector section which is electrically connected to the print section, the print section has: a receiving section which engages with the engagement section of the electronic camera section; the connector section which is electrically connected to the connector section of the electronic camera section; and a means for comparing the memory capacity of the writable storage means of the print section to the storage memory capacity of the storage means of the image signal photographed by the electronic camera section, and when the writable storage capacity of the print section is smaller than the storage capacity of the image signal captured by the electronic camera section, the image signal structured by the index display image plane of a plurality of images whose sizes are reduced, is transmitted to the print section with the priority.

In the case where the storage section of the image signal is respectively provided in the electronic camera section and the print section, when the maximum storage capacity of the print section is larger than the accumulated capacity of the maximum image data of the electronic camera section, under the condition that after all data of the electronic camera section has been transmitted, a print of the index image can be obtained in spite of the transmission sequence of the index image plane structured by a multi-image plane and the character information.

However, when the storage capacity of the print section is reduced and a low cost printing apparatus is provided, it becomes impossible that the image information previously accumulated inside the electronic camera section is transferred at once to the storage section of the print section.

Therefore, in the present invention, because the image signal storage capacity inside the electronic camera section can be compared to the storable image storage capacity of the print section, when the storable capacity of the print section is small, the index image including the multi-image is transmitted with priority.

By transferring the index image first, the index image can be printed, and the quality or the necessity of an individual image can be previously confirmed. When it is judged that the print is an inadequate or unnecessary image, the following countermeasure can be taken: the transmitting of the printed image data is not conducted selectively; it is transmitted to the printer after the image is corrected on the electronic camera section side; or when the photographic object scene can be photographed again, it is photographed again by changing the condition such as exposure or framing of the image, and is transmitted to the printer. Accordingly, the uselessness of printing material for printer such as an ink or paper in the case where the unnecessary image is printed in the full size, can be reduced. Specifically, in the case where the image capturing and printing apparatus is used for the use of portability, when the power supply for the print is insufficient, or the supply material such as paper or ink is insufficient, the effect of the previous transmitting of such the index image is high.

Further, because the index image forming function inside the electronic camera section is common, when the index image is transmitted with priority, the index image forming function which is duplicated with the function in the electronic camera section side, can be deleted from the print section, thereby, the print section whose cost is lower and which is more simple, can be realized.

(1-8) Incidentally, in the image capturing and printing apparatus of (1-7), when the index display image plane of a plurality of images whose image size is reduced, is structured by images of at least two kinds of images and the character information including the frame number other than the image, because the image to be saved by the user or to be transferred for printing is specified, it is convenient.

(1-9) An image capturing and printing apparatus of the present comprises: an electronic camera section having an image pick-up means for photographing a photographic object image and converting into an image signal; and a print section which is detachably installed in the electronic camera section, having a printing means for printing according to the image signal received from the electronic camera section, and the electronic camera section has: an engagement section mechanically engaged with the print section; a connector section electrically connected to the print section; and a transmission means for transmitting the image size information of the photographic object image to the print section prior to the transmission of the image signal; and the print section has: a receiving section which engages with the engagement section of the electronic camera section; and a connector section electrically connected to the connector section of the electronic camera section. Thereby, for example, according to the image size information of the photographic object image from the transmitting means, the size of the photographic image can be adjusted to the print size by using automatically interpolation, or the like, in the print section from the print sheets loaded at the present time and the kind of the ink, or when the print sheet loaded in the print section, or the like, does not adequately meet with the size of the transmitted photographic image, it can also be prevented that the improper print is formed, by giving an alarm, or the like.

(1-10) That is, in the image capturing and printing apparatus of (1-9), when the print section has an alarm means for giving the alarm when it is judged whether the size of the recording sheet set in the print means is proper to the image size, or not, according to the image size information of the photographic object image received from the transmitting means, and when it is improper, it can be easily prevented that the improper print is carried out.

(1-11) An image capturing and printing apparatus comprises: an electronic camera section having an image pick-up means for photographing a photographic object image and for converting into an image signal, and a processing means for processing the image signal and forming it into a plurality of hierarchical structures having different resolution; and a print section, which is detachably installed in the electronic camera section, for converting the plurality of hierarchical structures having different resolution, received from the electronic camera, into a print signal, and printing it, and the electronic camera section has: an engagement section mechanically engaged with the print section; and a connector section electrically connected to the print section; and a transmission means for transmitting the hierarchy necessary for the structure of the image signal according to at least 2 of the print resolution of the print section, the print image size, and the number of pixels to the print section, and the print section has: a receiving section engaged with the engagement section of the electronic camera section; and a connector section electrically connected to the connector section of the electronic camera section. Thereby, when the printable image size information of the print section is previously sent to the electronic camera section, for example, by providing the image processing function in the electronic camera section, the image processing in the print section can be unnecessary, and thereby, the structure of the print section can be simplified by its portion, and the print speed can be enhanced.

(1-12) An image capturing and printing apparatus comprises: an electronic camera section having an image pick-up means for photographing a photographic object image and for converting it into an image signal, and a processing means for processing the image signal and forming it into a plurality of hierarchical structures having different resolution; and a print section, which is detachably installed in the electronic camera section, for converting the plurality of hierarchical structures having different resolution, received from the electronic camera, into a print signal, and printing it, and the electronic camera section has: an engagement section mechanically engaged with the print section, and a connector section electrically connected to the print section, and a transmission means for transmitting the hierarchy necessary for the structure of the image signal according to at least 2 of the print resolution of the printer, the print image size, and the number of pixels to the print section, and the print section has: a receiving section engaged with the engagement section of the electronic camera section, and a connector section electrically connected to the connector section of the electronic camera section. For example, even when the image signal having the resolution exceeding the resolution set in the print section is transmitted into the print section, although the image quality of the print is not largely increased, there is a problem that the transmission time is extended. Accordingly, because the transmission means transmits the hierarchy necessary for the structure of the image signal according to at least 2 of the print resolution of the printer, the print image size, and the number of pixels to the print section, only the image signal necessary for the formation of the image is obtained in, the print section, and the printing can be started at once, thereby, the transmission time of the image signal can be reduced, and the speed of the print can be increased.

(1-13) An image capturing and printing apparatus comprises: an electronic camera section having an image pick-up means for photographing a photographic object image and converting it into an image signal, and the first storage means for storing the image signal; and a print section, which is detachably installed in the electronic camera section, having the second storage means for storing the image signal received from the electronic camera section, and a printing means for printing according to the image signal, and the electronic camera section has: an engagement section which mechanically engages with the print section, and a connector section which is electrically connected to the print section, the print section has: a receiving section which engages with the engagement section of the electronic camera section, and the connector section which is electrically connected to the connector section of the electronic camera section, and the image signal is selected and stored in either one of the first storage means and the second storage means. Thereby, because, by selecting the storage means having the larger storage capacity, the image signal can be stored, it can be suppressed that the storage capacity of either one of storage means is insufficient, thereby, the image signal can not be stored.

(1-14) Further, in the image capturing and printing apparatus of (1-13), when the comparison selection means for comparing the remaining storage capacity of the first storage means to that of the second storage means, and selecting the storage means having the larger remaining storage capacity, and storing the image signal in the selected storage means, is provided, it can be suppressed that the storage capacity of either one of storage means is insufficient, thereby, the image signal can not be stored.

(1-15) Alternatively, in the image pick-up apparatus of (1-13), it can also be considered to have a selection means for selecting one of the first storage means and the second storage means, and storing the image signal in the selected one storage means, and when the remaining storage capacity in one storage means is smaller than a predetermined amount, selecting the other storage means, and storing the image signal in the selected other storage means.

For example, in the case where the storage capacity of the electronic camera section and the print section are almost equal, when the image signal is separately stored in separated positions like as in the case where the image signal is stored initially in the electronic camera section, and next in the print section, a possibility that a trouble is increased when the user searches the image signal, is high. In order to avoid this, for example, initially, after the power supply is turned ON, the storage means having the larger remaining storage capacity is selected, and all the image signal obtained by the photographing are stored in this storage means, and when it is judged that the storage capacity is smaller than the image signal amount of the photographic object image to be photographed next, the other storage means can be selected.

(1-16) Further, in the image capturing and printing apparatus of one of(1-13) to (1-15), when the system is structured such that an operation member to select any one of the first storage means and the second storage means is provided, and the image signal is stored in the storage means selected by the operation member, because the specific image signal can be stored in any one of storage means according to the intention of the operator, the arrangement of the image, or the like, can be easily conducted, which is convenient.

(1-17) Further, in the image capturing and printing apparatus of one of(1-13) to (1-16), when the system is structured such that an alarm means for comparing the remaining storage capacity of the first storage means and the second storage means to a predetermined value, and for giving the alarm when the storage capacity is smaller than the predetermined value, is provided, it can be suppressed that the remaining storage capacity of the storage means is insufficient and the photographing can not be conducted, while the operator is not conscious of that.

(1-18) Incidentally, in the image capturing and printing apparatus of (1-17), it is preferable that the alarm means includes an output means for transmitting an alarm by using at least one of sound, light, and oscillation, however, the alarm transmitting means is not limited to these.

(1-19) Further, in the image prick-up printing apparatus of (1-18), it is preferable that the output means is provided in at least one of the electronic camera section and the print section.

(1-20) An image capturing and printing apparatus comprises: an electronic camera section having an image pick-up means for photographing a photographic object image and converting it into an image signal; and a print section, which is detachably installed in the electronic camera section, having a printing means for printing according to the image signal received from the electronic camera section, and a strobe or a strobe attachment means, and the electronic camera section has: an engagement section which mechanically engages with the print section; and a connector section which is electrically connected to the print section, and the print section has: a receiving section which engages with the engagement section of the electronic camera section; and the connector section which is electrically connected to the connector section of the electronic camera section. Therefore, it is not necessary that the strobe or the strobe attachment means is provided in the electronic camera section.

For the strobe, it is necessary to supply the large current from the power supply at the time of electrical charging for its light emission, and the load of the power supply capability is large for the electronic camera section, and the external size of the electronic camera section is affected by the size of the power supply unit. Concerning the power supply capability, although, recently, the reduction of electric power consumption amount of the print section is remarkable, on the one hand, when it is compared to the power consumption of the electronic camera, the larger electric power is still necessary, therefore, generally, the print section has a more sufficient power capacity than that of the electronic camera. Accordingly, when the structure like as attained by the image capturing and printing apparatus is adopted, the structure of the electronic camera section can be made smaller and more simple, and its power saving can also be achieved.

(1-21) An image capturing and printing apparatus comprises: an electronic camera section having an image pick-up means for photographing a photographic object image and converting it into an image signal; and a print section, which is detachably installed in the electronic camera section, having a printing means for printing according to the image signal received from the electronic camera section, and the electronic camera section has: an engagement section which mechanically engages with the print section, and a connector section which is electrically connected to the print section, and the print section has: a receiving section which engages with the engagement section of the electronic camera section, and the connector section which is electrically connected to the connector section of the electronic camera section, wherein a power supply means of the electronic camera section is provided detachably, and a cover of the power supply means is provided on the engagement surface of the electronic camera section with the print section. Therefore, when the electronic camera section and the print section are operated being engaged with each other, the careless operation stop of the electronic camera section and the print section according to the case in which the cover of the power supply means is opened by mistakes, or the like, can be prevented.

(1-22) An image capturing and printing apparatus comprises: an electronic camera section having an image pick-up means for photographing a photographic object image and converting it into an image signal, and a plurality of slots into which detachable recording media can be loaded; and a print section, which is detachably installed in the electronic camera section, having a printing means for printing according to the image signal received from the electronic camera section, and the electronic camera section has: an engagement section which mechanically engages with the print section, and a connector section which is electrically connected to the print section; and the print section has: a receiving section which engages with the engagement section of the electronic camera section, and the connector section which is electrically connected to the connector section of the electronic camera section, wherein the first slot in the plurality of slots is provided on the engagement surface of the electronic camera section with the print section, and the second slot in the plurality of slots is provided in a portion other than the engagement surface.

In the present invention, a plurality of slots are provided, and other than the first slot used for engagement of the electronic camera section and the print section, by using at least more than one slot provided on a portion other than the engagement surface on the electronic camera section side, the image information accumulated in the storage medium of the electronic camera section can be transferred to other storage medium, which is convenient. The first slot and the second and subsequent slots may also be not necessarily the same shape. Further, when the second and subsequent slots are, for example, used as the slot for exclusive use of the modem, and the data transfer is conducted by the modem, the widely used transmitting and receiving mode can be adopted.

(1-23) An image capturing and printing apparatus comprises: an electronic camera section having an image pick-up means for photographing a photographic object image and converting it into an image signal; and a print section, which is detachably installed in the electronic camera section, having a printing means for printing according to the image signal received from the electronic camera section, and the electronic camera section has: an exterior case, an engagement section which mechanically engages with the print section, and a connector section which is electrically connected to the print section, and the print section has: a receiving section which engages with the engagement section of the electronic camera section, and the connector section which is electrically connected to the connector section of the electronic camera section, wherein the engagement section is arranged so that it can relatively move to the case in at least one direction. Therefore, even when miss-matching, or the like, occurs between the electronic camera section and the print section due to manufacturing variations, or the like, the engagement section relatively moves, thereby, because such the miss-matching can be absorbed, the large stress does not occur in the engagement section.

(1-24) Incidentally, in the image capturing and printing apparatus of (1-23), when the engagement section is structured such that it can move two-dimensionally in the surface direction to the attachment surface of the case, and can rotate around the axis perpendicular to the attachment surface, the miss-matching in the various directions due to manufacturing variations can be absorbed between the electronic camera section and the print section.

(1-25) An image capturing and printing apparatus comprises: an electronic camera section having an image pick-up means for photographing a photographic object image and converting it into an image signal; and a print section, which is detachably installed in the electronic camera section, having a printing means for printing according to the image signal received from the electronic camera section, and the electronic camera section has: an engagement section which mechanically engages with the print section; and a communication means, which is provided on the engagement surface with the printer, for transmitting and receiving by using radio waves to and from the print section; and the print section has: a receiving section which engages with the engagement section of the electronic camera section; and a communication means, which is provided on the engagement surface, for transmitting and receiving by using radio waves to and from the electronic camera section. Therefore, the electrical connection between the electronic camera section and the print section by the wiring is not necessary for the transmission and reception of the image signal, thereby, troubles due to the incomplete contact, or the like, can be prevented, and the more user friendly structure can be provided. Incidentally, the communication means by using the radio wave herein is not limited to the communication means by using the radio wave, but, the communication means by using infrared ray or ultrasonic wave, or the like, is also included.

(1-26) Incidentally, in the image capturing and printing apparatus of (1-25), generally, because, in many cases, the print section has the larger power supply capability than that of the electronic camera section, the power supply to the electronic camera section can be conducted from the print section side by wiring, thereby, effective power feeding can be conducted.

(1-27) An image capturing and printing apparatus comprises: an electronic camera section having an image pick-up means for photographing a photographic object image and converting it into an image signal, and a release means; and a print section, which is detachably installed in the electronic camera section, having a printing means for printing according to the image signal received from the electronic camera section; and a storage means for storing the image signal, and the electronic camera section has: an engagement section which mechanically engages with the print section; and a connector section which is electrically connected to the print section, and the print section has: a receiving section which engages with the engagement section of the electronic camera section; a connector section which is electrically connected to the connector section of the electronic camera section, wherein, corresponding to a photographing start signal from the release means, the photographing of the photographic object image, storing of the image signal, and printing are conducted.

In the present invention, because, corresponding to a photographing start signal from the release means, the photographing of the photographic object image, storing of the image signal, and printing are conducted, the operation except the release means is not specifically necessary, and the print can be obtained at the place at which the photographic object image is photographed.

Even when the low age child or the user who is unfamiliar to the mechanical operation, uses this image capturing and printing apparatus, when the operation is a single operation to press the release, the difficulty of the operation is small, and this image capturing and printing apparatus can be easily used.

Further, as a first step, although only one print is necessary, however, when a use is the case where the change, in which the difference of the photographic object is so small and delicate that the difference can not be confirmed when its printing is not conducted, is photographed, for example, in the case of the photographing of the waveform of the measuring instrument, or in the case of a use to record a delicate look in the portrait, when the images are saved to some extent, and the necessary image data is selected and printed, there is a case where a delicate change is not photographed as expected. In such the case, when the photographing is conducted, the printing is conducted at once, thereby, it can be confirmed by viewing the print at each time whether the important scene can be recorded.

Further, if the print setting such as the number of necessary print sheets or the size can be conducted at any time on a stand-by condition except during a photographing operation and a printing operation after the power supply has been turned ON, since the desired number of prints and size can be changed in accordance with the situation, the convenience which is not obtained by the instant photography to always obtain a print one by one with the silver halide film, can be provided.

(1-28) In the image capturing and printing apparatus of (1-27), the print section conducts printing after the storage section stores the image signal.

(1-29) In the image capturing and printing apparatus of (1-27), the print section conducts printing while the storage section stores the image signal.

In the order of a series of operations of the photographing of the photographic object image, storing of the image signal, and print operated corresponding to the photographing start signal from the release means, two methods are considered for the storing of the image signal and print.

One is a method by which the print is conducted after the storing of the image signal of one sheet has been completed. Because the storing has been completed, even when any-thing unusual occurs in the printing operation, by reading out the image data stored in the print section, the print can be conducted again.

The other is a method by which the storing and the printing are conducted by time division, by conducting the storing for each line when the printer conducts print processing for each line. The method in which, when it is viewed from the external, it can be viewed as if the storing and the printing are conducted in parallel, is considered. In this method, the re-start of the print when any thing unusual occurs in the printing operation, is conducted by the following: the data transferring is conducted again from the electronic camera section side.

(1-30) An image capturing and printing apparatus comprises: an electronic camera section having an image pick-up means for photographing a photographic object image and converting it into an image signal; a print section, which is detachably installed in the electronic camera section, having a printing means for printing according to the image signal received from the electronic camera section, and the electronic camera section has: an engagement section which mechanically engages with the print section; the first connector section which is electrically connected to the print section; and the second connector section which is electrically connected to the external equipments, and the print section has: a receiving section which engages with the engagement section of the electronic camera section; and the connector section which is electrically connected to the electronic camera section, wherein the electronic camera section detects which one of the electronic camera section and external equipments is connected, and changes the processing by the image processing means corresponding to the detection result. Thereby, for example, corresponding to the use, the electronic camera section of the image capturing and printing apparatus can be connected to a personal computer or another high speed printer, as the external equipments, and when the format which can be recognized by these external equipments, can be set, the higher image processing or the high speed print can be conducted.

(1-31) Further, in the image capturing and printing apparatus of (1-30), it is preferable when the processing by the image processing means is at least one of the data format conversion such as, when the electronic camera section is connected to the print section, the image processing such as the image enhancement or color area conversion which is optimized for the printing of the print section, or when it is connected to the personal computer, the change of the image processing such as the image processing optimized for the display monitor image, and, for example, when it is connected to the print section, the YUV format of the RAW type is used, or when it is connected to the personal computer, the RGB data format of the Bitmap type is used.

(1-32) Further, in the image capturing and printing apparatus of one of (1-30) or (1-31), when the first connector section and the second connector section is common, the user is not puzzled for the connection, thereby, the more user-friendly structure can be provided.

(1-33) Further, in the image capturing and printing apparatus of one of (1-30) to (1-32), the electronic camera section has the operation section, and when it is judged that the electronic camera section is connected to the print section, according to the detection result, the predetermined operation which is operated by only the interlock with the print section according to the operation of the operation section, is allowed, however, when it is judged that the electronic camera section is connected to the external equipment, according to the detection result, the predetermined operation according to the operation of the operation section is inhibited, thereby, the miss-operation of the electronic camera section which is induced by conducting the operation which is barely operated by only the interlock with the print section, although the print section does not exist, can be suppressed.

(1-34) An image capturing and printing apparatus comprises: an electronic camera section having an image pick-up means for photographing a photographic object image and converting it into an image signal; a print section, which is detachably installed in the electronic camera section, having a printing means for printing according to the image signal received from the electronic camera section, and an external equipment control means for controlling the electronic camera section and the external equipments different from the electronic camera section, and the electronic camera section has: an engagement section which mechanically engages with the print section; and a connector section which is electrically connected to the print section, and the print section has: a receiving section which engages with the engagement section of the electronic camera section; the first connector section which is electrically connected to the electronic camera section; and the second connector section which is electrically connected to the external equipments, wherein the printer section detects which one of the electronic camera section and external equipments different from the electronic camera section, is connected, and changes the processing by the external equipment control means corresponding to the detection result.

Therefore, corresponding to the use, the print section of the image capturing and printing apparatus can be connected to a flat bad scanner, or the electronic camera with the different resolution, and when the format used in these external equipments is set, the print and image capturing in the wider use can be brought.

(1-35) Further, in the image capturing and printing apparatus of (1-34), the processing by the external equipment control means is one of a change in an input/output image processing, a data format, an ordering system, and a change in an image size.

It is preferable when the processing by the external equipment control means is one of the following: when the electronic camera section is connected to the print section, the image processing such as density characteristic, gradation property, spatial frequency characteristics, color gamut conversion, which optimizes the printing corresponding to the characteristic of the input image from the electronic camera section, or when it is connected to the flat bed scanner, the change of the image processing such as image processing which optimizes the input image from the scanner, and the change of the data format such as, for example, when it is connected to the electronic camera section, the YUV data format of the RAW type is used, or when it is connected to the flat bed scanner, the RGB data format of the RAW type is used, or the access signal control or control protocol control, which is respectively appropriate for the electronic camera and the flat bed scanner, or the change of image size to re-size the input image size so as to be suitable for the print size.

Incidentally, herein, the operation by the switch of the electronic camera section and the flat bed scanner is described as an example, however, it is clear that, when the same switch setting is conducted, the connection to the other external equipment can be attained.

(1-36) Further, in the image capturing and printing apparatus of one of (1-34) or (1-35), when the first connector section and the second connector section are common, because there is no case where the user is confused by the connection to the print section and the external equipment, the more user friendly structure can be provided.

(1-37) In the image capturing and printing apparatus of one of one of (1-34) to (1-36), the electronic camera section has the operation means and when the print section judges that the print section is connected to the electronic camera section, according to the detection result, a predetermined operation according to the operation of the operation means of the electronic camera section is allowed, however, according to the detection result, when it is judged that the print section is connected to the external equipment different from the electronic camera section, a predetermined operation according to the operation of the operation means of the electronic camera section is inhibited in the print section, thereby, the miss-operation of the print section which is induced by conducting the operation, which is barely operated only by the interlock with the electronic camera section, such as, for example, the release operation, although the electronic camera section does not exist, can be suppressed.

(1-38) An electronic camera, comprises:
  an image pick-up device for photographing a object image to be photographed so as to convert the photographed object image into image signals;
  an engaging section adapted to mechanically engages with a printing section structured so as to be detachably attached to the electronic camera section;
  a connecting section adapted to electrically connect with the printing section; and
  communicating means for transmitting the image signals to the printing section.

(1-39) A printer, comprises:
  an engaging section to engage with an electronic camera structured so as to be detachably attached to the printer;
  a connecting section adapted to electrically connect with the electronic camera; and
  receiving means for receiving image signals from the electronic camera; and
  printer for conducting printing on the basis of the image signals.

Next, a preferred structure to attain the second object will be described.

(2-0): A print producing apparatus having: a slot into which the storage means can be loaded; a detection means for detecting that the storage means is inserted into the slot; a reading means for reading out the image data and processing conditions stored in the storage means; a means for conducting the image processing on the read-out data according to the data; and a printing means for printing according to the image processed image data. According to the processing condition data such as the color management information, or the like, including color conversion table different for each of kinds of products of the digital still camera, the higher quality image can be printed.

(2-1): In the print producing apparatus of(2-0), the processing condition data includes the color management information.

(2-2): Further, in the print producing apparatus of (2-0) or (2-1), by providing a means for detecting whether the data stored in the storage means is the recognizable image data, or not, when, for example, the file type (JPEG, or the like) of the image data is not the type which can not be read by the print producing apparatus, the countermeasure to stop the reading-in of such the image data, or the like, can be taken, thereby, the error in the printing can be prevented.

(2-3): Further, in the print producing apparatus of (2-2), when there is no image data which can be recognized, in the storage means, by providing an alarm means for giving an alarm, for example, the user can be prompted to replace the storage means.

(2-4): Further, in the print producing apparatus of any one of (2-1) to (2-3), when a means for confirming the correspondence between the image data and the color management information, is provided, for example, in a single storage means, in the case where the image data from a plurality of digital still camera is included, it can be prevented that the confusion occurs between the color management information corresponding to the image data obtained by the photographing by one digital still camera, and the color management information corresponding to the image data obtained by the photographing by another digital still camera, and the image quality in the formed print can be maintained high.

(2-5): In the print producing apparatus of any of (2-1) to (2-4), the confirming means confirms the correspondence based on-the tag information of the image data and the name provided to the color management information. Incidentally, for example, as the tag information, when the name of kinds of cameras, or the like, is stored, the confirmation means can confirm the correspondence according to the name of kinds of cameras as the tag information of the image data and the name designated to the color management information.

(2-6): Further, in the print producing apparatus of any one of (2-1) to (2-5), the color management information can be used by selecting one of a single or plurality of pieces of information.

(2-7): In the print producing apparatus of (2-6), for example, when the latest color management information is used, an image having the higher image quality can be printed.

(2-8): Further, in the print producing apparatus of (2-6), the image data includes the photographed camera information, and according to the camera information, at least one of the plurality of color management information, for example, the latest information can be selected.

(2-9): Further, in the print producing apparatus of (2-6), when the print producing apparatus is provided with a storage means for storing the color management initial information, and a re-writing means for comparing the read-out color management information to the version of the color management initial information, and for re-writing the older color management information into the information of the latest version, because the print formation can be conducted by appropriately using the color management information of the latest version, the image having the higher image quality can be formed.

(2-10): According to the print producing apparatus having: the first slot to read the image data from the first storage means; the second slot to read the processing condition data to use for image processing from the second storage means; a reading means for reading out the image data and the processing condition data stored in the storage means, corresponding to the detection result; a means for conducting the image processing according to the processing condition data on the read-out image data; and a print means for forming the print according to the image data on which the image processing is conducted, the data processing can be conducted more quickly, by using a single slot than in the case in which the image data and the processing condition data are read out.

(2-11): Further, in the print producing apparatus of (2-10), when the processing condition data is the color management information, according to the color management information, the image having the higher image quality can be printed.

(2-12): Further, in the print producing apparatus of (2-10), in the case where the storage means in which the information other than the image data is stored, is inserted in the first slot, when an alarm means for giving an alarm is provided, by such the alarm, it can be informed to the user that, for example, the storage means to be inserted into the second slot is inserted into the first slot by mistake.

(2-13): Further, in the print producing apparatus of (2-10), in the case where the storage means in which the information other than the image data is stored, is inserted in the second slot, when an alarm means for giving an alarm is provided, by such the alarm, it can be informed to the user that, for example, the storage means to be inserted into the first slot is inserted into the second slot by mistake.

(2-14): Further, in the print producing apparatus of (2-10), in the case where the storage means in which the processing condition data is stored, is inserted into the first slot, and the storage means in which the image data is stored, is inserted into the second slot, when the processing condition data is read from the storage means inserted into the first slot, and the image data is read from the storage means inserted into the second slot, it can be prevented that the data is read by mistake, and this system is convenient.

(2-15): Further, in the print producing apparatus of any one of (2-10) to (2-14), when the processing condition data is printed, the user can confirm whether, for example, the color management information is the latest version, or the like, according to such the print.

(2-16): Incidentally, in the print producing apparatus of (2-15), when the processing condition data is printed together with the corresponding image, the correspondence relationship with the image can be more clearly confirmed, and which is convenient.

(2-17): Further, in the print producing apparatus of any one of (2-10) to (1-16), when a display means for displaying the processing condition data is provided, the user can confirm that, for example, the color management information is the latest version, or the like, according to such the display.

(2-18): Incidentally, in the print producing apparatus of (2-17), when the processing condition data is displayed together with the corresponding image, the correspondence relationship with the image can be more clearly confirmed, and which is convenient.

(2-19): An image display apparatus having: a slot into and from which the storage means is attachable and detachable; an image display means; a detection means for detecting that the storage means is inserted into the slot; and a means for reading out the image data stored in the storage means, and for displaying the image in a sight base according to the read-out image data on the image display means. Thereby, without any special operation, because all images are automatically displayed at a time on the same screen in response to the insertion of the storage means into the slot, the image can be easily confirmed.

(2-20): Further, in the image display apparatus of (2-19), when a means for selecting the number of sheets of images displayed on the image display means is provided, the images of small number of sheets can also be displayed, and thereby, because each of images can be displayed in a large size, the image can be more-easily confirmed.

(2-21): Further, in the image display apparatus of either one of (2-19) or (2-20), when a designation means for designating-the image is provided, and the designation means for designating the image designates the first sheet image at the time of displaying images at a time on the same screen, it can be confirmed at a glance whether the image is the first sheet image, and which is convenient.

(2-22): Incidentally, in the image display apparatus of (2-21), when the first sheet image can be made to be the image with the latest photographing date, or the latest image can be made to be the first sheet image, it is convenient.

(2-23): Further, in the image display apparatus of (2-21), when the first sheet image can be made to be the image with the oldest photographing date, it is convenient.

(2-24): An image display and printing apparatus having: a slot into and from which the storage means is attachable and detachable; an image display means; a printing means; a detection means for detecting that the storage means is inserted into the slot; and a means for reading out the image data stored in the storage means, and for displaying the image in a sight base according to the read-out image data on the image display means; and a designation means for designating the image to be printed by the printing means, according to the display in a sight base. Thereby, without any special operation, because the images are automatically displayed at a time on the same screen in response to the insertion of the storage means into the slot, the image before printing can be easily confirmed.

(2-25): Further, in the image display apparatus of (2-24), when the designation includes the number of printing sheets, print can be conducted for the desired number of printing sheets.

(2-26): in the image display apparatus of either one of (2-24) or (2-25), when the image display means has a plurality of image planes for displaying the images, the image plane for displaying the thumbnail and the image plane for displaying the original image are respectively displayed on the separated image planes, or one panorama image can be displayed ranging over 2 image planes.

(2-27): A print producing apparatus having: a display image plane to input the information necessary for forming the print; a detection means for detecting the attached print forming medium; a judgment means for judging whether the print can be formed, according to the inputted information for forming the print and the detection result of the detection means; and an alarm means for giving an alarm when the judgment means judges that the print can not be formed. For example, when an inappropriate print forming medium is attached for the desired print, because the judgment means judges that the print can not be formed, and the alarm means alarms corresponding to that, the operator can take a countermeasure to set an appropriate print forming medium, or the like, by such the alarm.

(2-28): Incidentally, in the print producing apparatus of (2-27), when the detection means detects the size of the print forming medium attached to the print producing apparatus, and the necessary information for forming the print includes the size of the print, the judgment means can judge whether the size of the attached print forming medium is appropriate.

(2-29): Further, in the print producing apparatus of (2-28), in the case where the judgment means judges that the aspect ratio of the print size is inappropriate for the aspect ratio of the image to be printed, when a selection means for selecting either one of the output form in which the image is reduced and outputted as a one sheet of print, or in which the image is not reduced and outputted as a plurality of sheets of prints in small pieces, is provided, the print can be conducted in a desired form by the operator.

(2-30): Further, in the print producing apparatus of any one of (2-27) to (2-29), when the detection means detects the material of the print forming medium attached to the print producing apparatus, and the necessary information for forming the print includes the material of the print, the judgment means can judge whether the material of the attached print forming medium is appropriate.

(2-31): On the one hand, in the print producing apparatus of any one of (2-27) to (2-30), when the detection means detects the surface processing of the print forming medium attached to the print producing apparatus and further, the information necessary for forming the print includes the surface processing of the print, the judgment means can judge whether the surface processing of the attached print forming medium is appropriate.

(2-32): Further, in the print producing apparatus of any one of (2-27) to (2-31), in the case where the alarm means is structured such that it gives the alarm by changing the displaying form on the display image plane, when, for example, the judgment means judges that the specific image can not be printed, by the alarm means, by changing the color of this image from, for example, the color to the monochrome, the operator can confirm the image whose print formation can not be conducted, at a glance.

(2-33): Further, in the print producing apparatus of any one of (2-27) to (2-32), when the alarm means gives the alarm by the sound or voice, it can be judged through the operator's hearing sense whether the print formation can be conducted, and which is convenient.

(2-34): A print producing apparatus, which having: a reading means for reading the image data and the print forming information corresponding the image data, from the readable storage medium in which the image data and the print forming information corresponding to the image data are stored; and a print forming means for forming the print according to the information read out by the reading means, wherein the print producing apparatus automatically reads out the information by the reading means when the storage medium is loaded in the reading means, and forms the print by the print forming means according to the information. Thereby, without requiring any special operation, when the storage medium is loaded in the reading means, because the print is automatically conducted, the print formation can be easily conducted.

(2-35): A print producing apparatus, which having: a reading means for reading the image data and the print forming information corresponding the image data, from the readable storage medium in which the image data and the print forming information corresponding to the image data are stored; and a print forming means for forming the print according to the information read out by the reading means, wherein the print producing apparatus automatically reads out the print forming information corresponding to at least the image data by the reading means when the storage medium is loaded in the reading means, and forms the print of the print forming information corresponding to the image data by the print forming means according to the information. Thereby, without requiring any special operation, when the storage medium is loaded in the reading means, because the print of the print forming information is automatically conducted, the print forming information can be easily confirmed.

(2-36): Further, in the print producing apparatus of either one of (2-34) or (2-35), in the case where the print forming information read our by the reading means does not have a specific file structure, when the print is not conducted by the print forming means, the occurrence of the print error, or the like, can be prevented.

(2-37): A print producing apparatus having a reading means for reading out the information from the storage medium which can read the information; and a print forming means for forming the print according to the red-out information by the reading means, wherein the print producing apparatus automatically reads out the information by the reading means and stores the information in the storage means' when the storage medium is loaded in the reading means. Thereby, without requiring any special operation, when the storage medium is loaded in the reading means, because the information is automatically stored, and for example, when the information is the print forming formation, the storage of such the forming information can be easily conducted, ready for the print.

(2-38): Further, in the print producing apparatus of (2-37), when the display means for displaying according to the information is provided and the print forming information is presented through such the display means, the operator can confirm the presented print forming information. Incidentally, herein, the word of present (presentation) also includes that the announcement is conducted by the voice, or the signal is transmitted to the connected digital still camera and displayed on the liquid crystal image plane of the digital still camera, other than that, for example, the thumbnail image and characters are displayed on the liquid crystal image plane.

(2-39): A print producing apparatus, which having: an exclusive use reading means for reading the information from a storage medium from and into which the information can be read and written; a reading and writing means for reading the information from a storage medium from and into which the information can be read and written, and for writing the information into the storage medium; and a print forming means for forming the print according to the information read out by the reading means. Thereby, for example, for the storage medium in which the information whose erasing is not desired, is stored, by reading the information using the exclusive use reading means, the disadvantage in which such the information is erased by mistake, can be prevented.

(2-40): A print producing apparatus having: a body; a reading means for reading the information from the storage medium from which the information can be read; and a print forming means for forming the print according to the information read out by the reading means, wherein two reading means are provided, and the surfaces of the body on which the two reading means are arranged, are different from each other. For example, for the storage medium in which the information whose erasing is not desired, is stored, by reading the information by the reading means which is arranged on a specific surface, the disadvantage in which such the information is erased by mistake, can be prevented.

(2-41): A print producing apparatus, having: a body; a reading means for reading the information from the storage medium from which the information can be read; and a print forming means for forming the print according to the information read out by the reading means, wherein the surface of the body from which the storage medium inserted into the reading means is ejected, is different from the surface of the body from which the print formed by the print forming means is delivered. Thereby, even when the print delivery and the insertion or ejection of the storage medium are simultaneously conducted, the interference between the print and the storage medium can be suppressed, and thereby, the occurrence of errors can be prevented.

(2-42): Incidentally, in the print producing apparatus of any one of (2-39) to (2-41), the print producing apparatus itself has a small size and light weight.

(2-43): For example, it is preferable that its weight is not larger than 200 grams.

(2-44): A print producing apparatus, which has a storage medium which is in a storable condition, or a communicable interface, and to which an apparatus interchangeable with the storage medium can be equipped, wherein, when the first storage medium in which the image data for the print and/or the concerning data are stored, is loaded in the exclusive use reading means, these data are automatically read out and written into the second storage medium or apparatus. Thereby, without requiring any special operation, the data copy can be easily conducted. Incidentally, the communicable interface means a modem card, LAN card, and infrared ray communication apparatus, etc., which can communicate with the external server, or the like.

(2-45): Further, in the print producing apparatus of any one of (2-39) to (2-44), when the data to be written is separated for each read only medium, in the storage medium into which the data is written, the arrangement of data can be easily conducted.

(2-46): Further, in the print producing apparatus of any one of (2-39) to (2-44), in the case where the data read from the first storage medium is written into the second storage medium, the data of the second storage medium into which the data is going to be written is read out, and it is compared to the data to be written in the first storage medium, and in the case where these are the same, when the writing is inhibited, for example, even when the first storage medium in which the data is written, is read many times by the exclusive use reading means by mistake, the data written into the second storage medium is only the initially read data, thereby, it can be prevented that the remaining storage amount of the other storage medium is reduced.

(2-47): Further, in the print producing apparatus of any one of (2-39), (2-44), (2-45) or (2-46), when the mechanism to mechanically block the loading or ejection of the storage medium during the data read-out or writing-in, is provided, the damage of the data can be prevented.

(2-48): An image display apparatus, having: a reading and/or writing means for reading the information from and/or writing it into the storage medium from or into which the information can be read and/or written; and a display means for displaying the image according to the information read by the reading and/or writing means, wherein the at least two reading and/or writing means are provided, and one of them is an exclusive use for reading. For example, for the storage medium in which the information whose erasing is not desired, is stored, by reading the information using the exclusive use reading means, the disadvantage in which such the information is erased by mistake, can be prevented. It is preferable that at least one read only means, and at least one reading and writing means are provided.

(2-49): An image display apparatus, which has a storage medium which is in a storable condition, or a communicable interface, and in which an apparatus interchangeable with the storage medium can be equipped, wherein, when the first storage medium in which the image data for the print and/or the concerning data are stored, is loaded in the exclusive use reading means, these data are automatically read out and written into the second storage medium or apparatus. Thereby, without requiring any special operation, the data copy can be easily conducted. Incidentally, the communicable interface means a modem card, LAN card, and infrared ray communication apparatus, etc., which can communicate with the external server, or the like.

(2-50): Further, in the image display apparatus of (2-49), when the data to be written is separated for each read only medium, in the storage medium into which the data is written, the arrangement of data can be easily conducted.

(2-51): Further, in the image display apparatus of (2-49), in the case where the data read from the first storage medium is written into the second storage medium, the data of the other storage medium into which the data is going to be written is read out, and it is compared to the data to be written in the first storage medium, and in the case where these are the same, when the writing is inhibited, for example, even when the first storage medium in which the data is written, is read many times by the exclusive use reading means by mistake, the data written into the second storage medium is only the initially read data, thereby, it can be prevented that the remaining storage amount of the other storage medium is reduced.

(2-52): Further, in the image display apparatus of any one of (2-49) to (2-51), when the mechanism to mechanically block the loading or ejection of the storage medium during the data read-out or writing-in, is provided, the damage of the data can be prevented.

Incidentally, structures (2-20) to (2-52) may be used as the print section or the printing apparatus in the structures (1-1) to (1-39).

BRIEF DESCRIPTION OF THE DRAWINGS

FIG. 5(a) is a view showing the image capturing and printing apparatus into which the electronic camera section and the print section are integrated, and FIG. 5(b) is a view showing the electronic camera section and the print section under the condition that these are separated from each other.

FIG. 6(a) is a perspective view showing its back, FIG. 6(b) is a perspective view showing its front.

FIG. 9(a) is a view showing the characteristics for each connected apparatus to which the electronic camera portion 110 is connected through a USB I/F portion 116, and FIG. 9(b) is a view showing the characteristics for each connected apparatus to which the print section 150 is connected through a USB host I/F portion 151.

DETAILED DESCRIPTION OF THE PREFERRED EMBODIMENT

Figure 1:
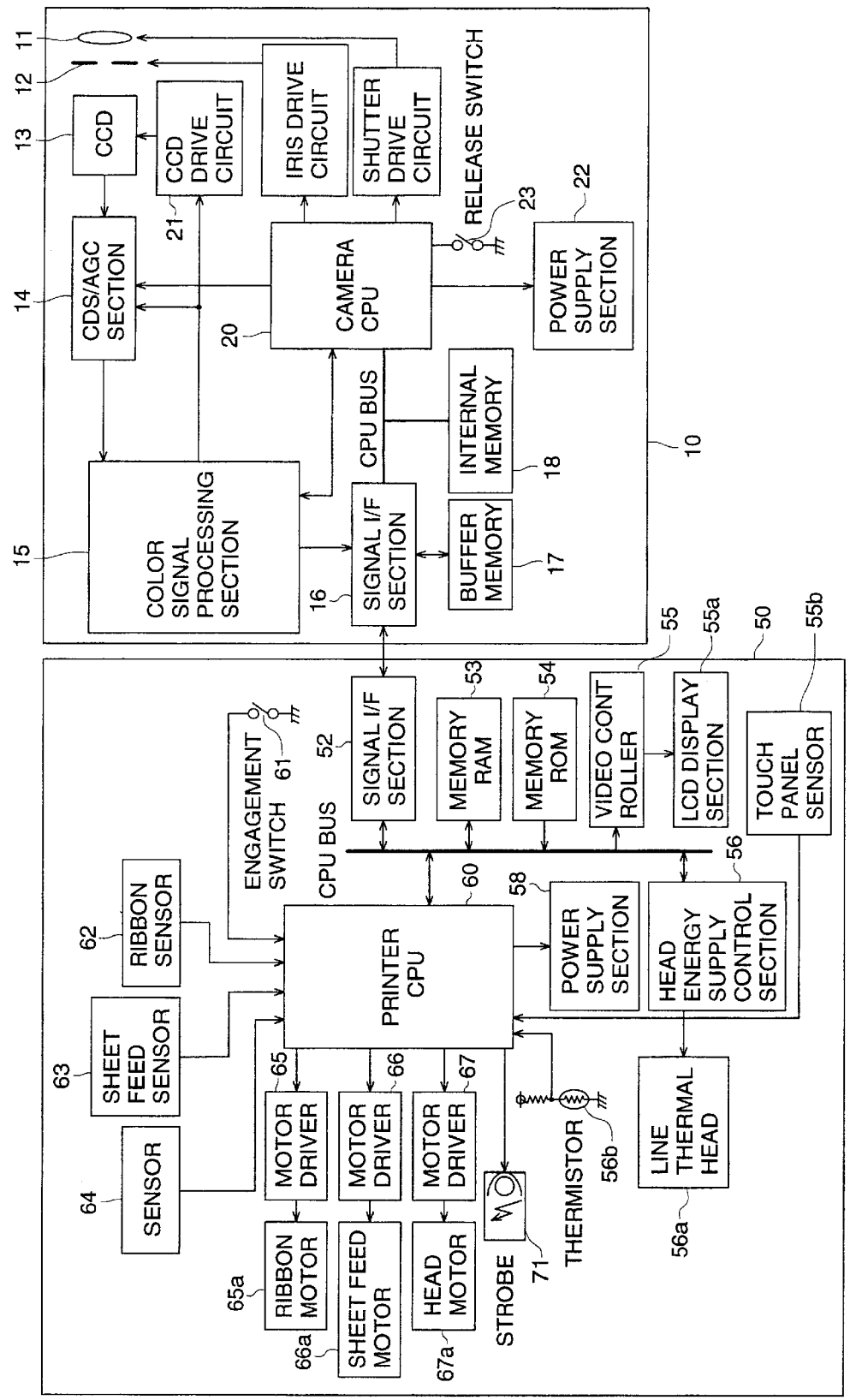
FIG. 1 is a block diagram showing a structure of the image capturing and printing apparatus composed of the electronic camera section 10 and a print section 50 according to the first embodiment.

Referring to the drawings, embodiments according to the present invention will be described below.

FIG. 1 is a block diagram of an image capturing and printing apparatus composed of an electronic camera section 10 and a print section 50 according to the first embodiment. In FIG. 1, the electronic camera section 10 has: a lens 11; a CCD 13 as an image pick-up means for converting an optical image formed by a mechanical iris 12 into an analog signal; a CDS/AGC section 14 by which, after a predetermined preprocessing is conducted on the analog signal from the CCD 13, the pre-processed image signal is converted into a digital signal; a color signal processing section 15 by which the output signal from the CDS/AGC section 14 is converted into a color signal, and a timing pulse to drive the CCD 13 is generated; a CCD drive circuit 21 to generate the CCD drive signal by using the timing pulse generated in the color signal processing section 15; a signal I/F section 16 to communicate with the outside; a buffer section 17 to temporarily store the image data for the timing adjustment, when the color signal processed image data is sent to the print section through the external communication; an internal memory 18 to accumulate the captured image data; and a camera CPU 20 connected to electrically control these camera operations. The CPU 20 has a ROM/RAM for executing a program inside, and is connected to the signal I/F section 16 and the internal memory 18 through a CPU bus, and the color signal processing section 15 and the CDS/AGC section 14 are connected to the CPU 20 for the operation setting, and a release button 25 is connected to the CPU 20 as an interruption input.

Further, the camera CPU 20 is structured such that the electric power is supplied from the power supply section 22 to the CPU 20, and the release signal is inputted from a release switch 23 to the CPU 20. Incidentally, the internal memory 18 and power supply section 22 provided in the present embodiment, are not always necessary structure in the electronic camera section 10, and, for example, can share the memory and power supply section of the print section 50, which will be described later, and it is possible that the power supply is supplied from the print section 50 to the electronic camera section 10, and a captured image is not recorded in the internal memory 18 and directly sent to the print section 50. Thereby, a simple and low cost structure can be provided.

Specifically, the printer section except the power supply section (herein, tentatively named A block), the electronic camera section except the power supply section (tentatively named B block), and the common power supply section (tentatively named C block), are respectively structured to be detachable, and the objects of the present invention can be attained by the following structures: when only camera is used, the structure of B+C is applied; when it is used as the printer, the structure of A+C is applied; and when these are integrally used, the structure of A+B+C is applied.

On the one hand, in the present embodiment, the print section 50 provided with the printing means of a thermal sublimation type has: the signal I/F 52 to communicate with the external; a memory RAM 53 to temporarily hold the data to execute a program or to temporarily hold the image signal to make the print data; a memory ROM 54 to hold the program itself or fixed numerical values; a video controller 55 having the LCD display section 55a; and a head electrical turning-on control section 56 to electrically turning-on-control a thermal head 56a which is a printing means, which are respectively connected so as to be controllable through the CPU bus 51 of the external printer CPU 60. Incidentally, the head electrical turning-on control section 56 feeds back a temperature correction value to the line thermal heads 56a through the printer CPU 60 according to the detection signal from a thermister 56b to detect the temperature of the thermal heads 56a. Incidentally, this CPU 60 is so-called a multifunction CPU, and has an AD conversion function to digitize the temperature signal from the thermister 56b or the analog signal inputted from a touch panel sensor in the inside, and a timer function to execute the program in the inside, however, because the multifunction CPU having these functions is widely known, it will not be described herein.

The printer CPU 60 of the print section 50 has functions to start the electronic camera section 10 which is in a sleep condition, through the communication with the camera CPU 20, or to initialize it, for example, an internal setting to make it to function as a camera. Further, to the printer CPU 60, the electric power is supplied from the power supply section, and the release signal from the release switch 23 and an engagement signal from an engagement switch 61 are inputted. Further, the printer CPU 60 is connected to a ribbon sensor 62 to detect a head-up position of the ink ribbon, a sheet feed sensor 63 to detect a print head-up position of the feeding sheet and the remainder of remained print sheets, and a sensor 64 to detect the insertion of the print sheet by hand feeding by the user, and these signals are inputted to the printer CPU 60, and the printer CPU 60 is connected to a motor driver 65 to drive a motor 65a to supply the ink ribbon, a motor driver 66 to drive a motor 66a to feed the sheets, a motor driver 67a to drive a motor 67a to apply a predetermined had weight, and a strobe 71, so that the printer CPU 60 can control them.

Figure 2A:
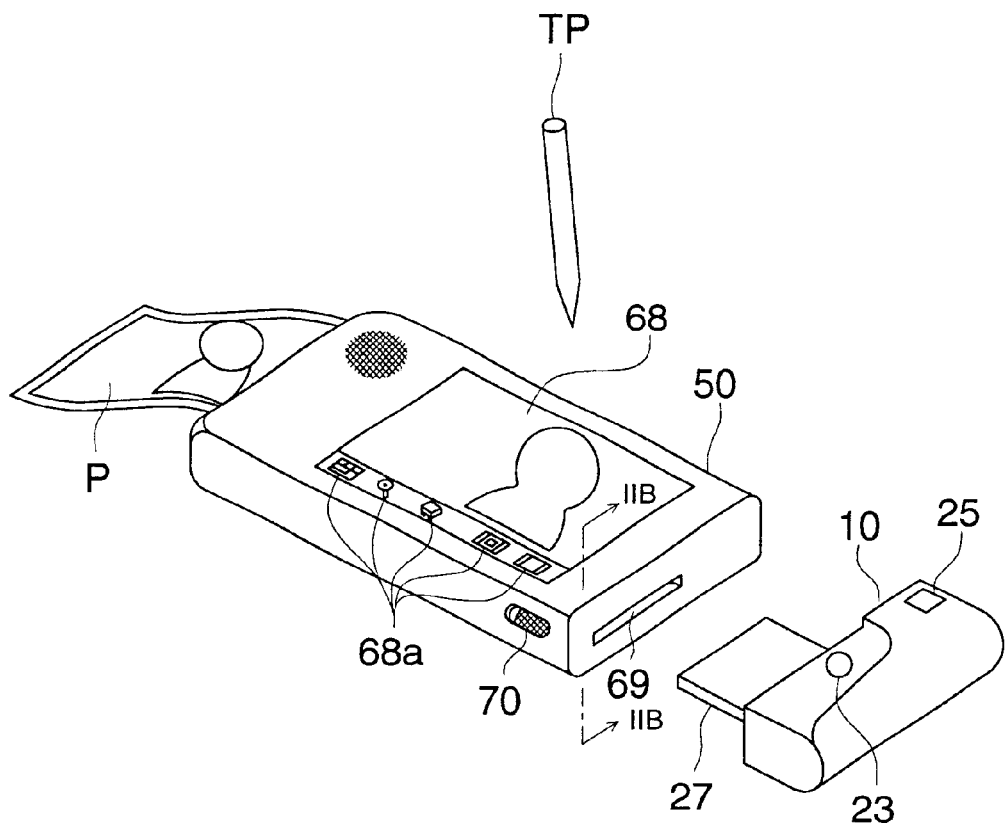
FIG. 2(a) is a perspective view showing the image capturing and printing apparatus according to the present embodiment.
Figure 2B:
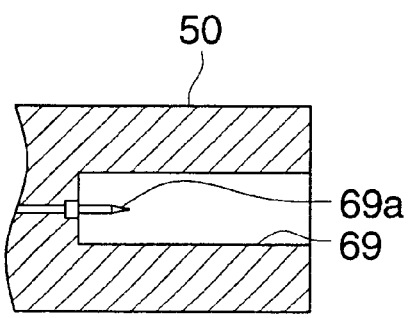
FIG. 2(b) is a view in which the structure of FIG. 2(a) is cut by a IIB—IIB line and which is viewed in the arrowed direction.
Figure 3:
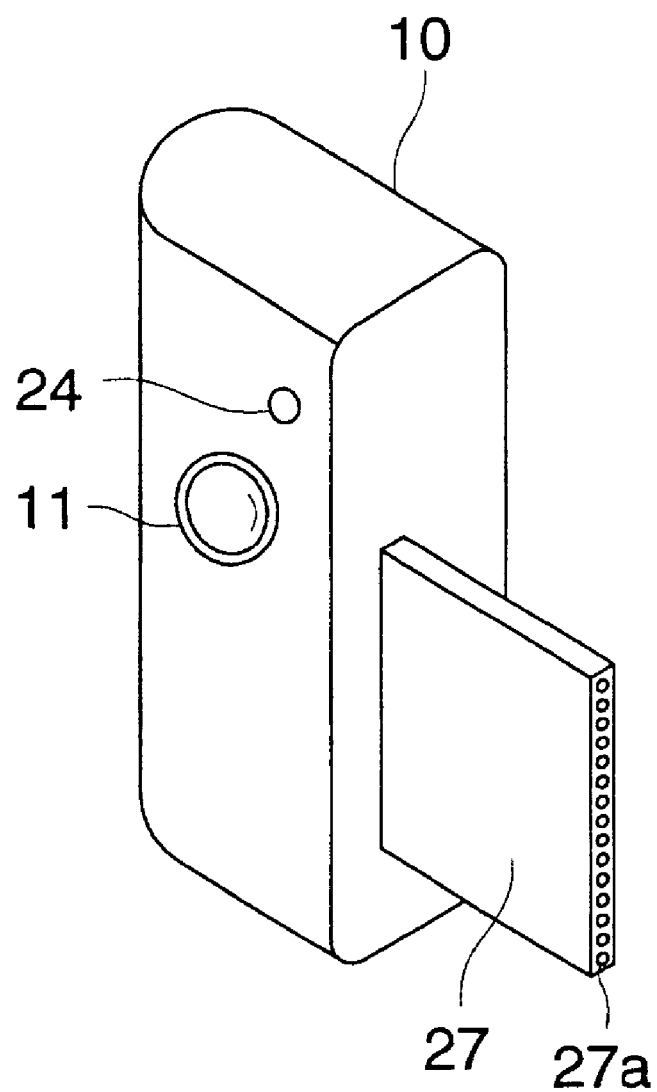
FIG. 3 is a perspective view of the electronic camera section 10.
Figure 4:
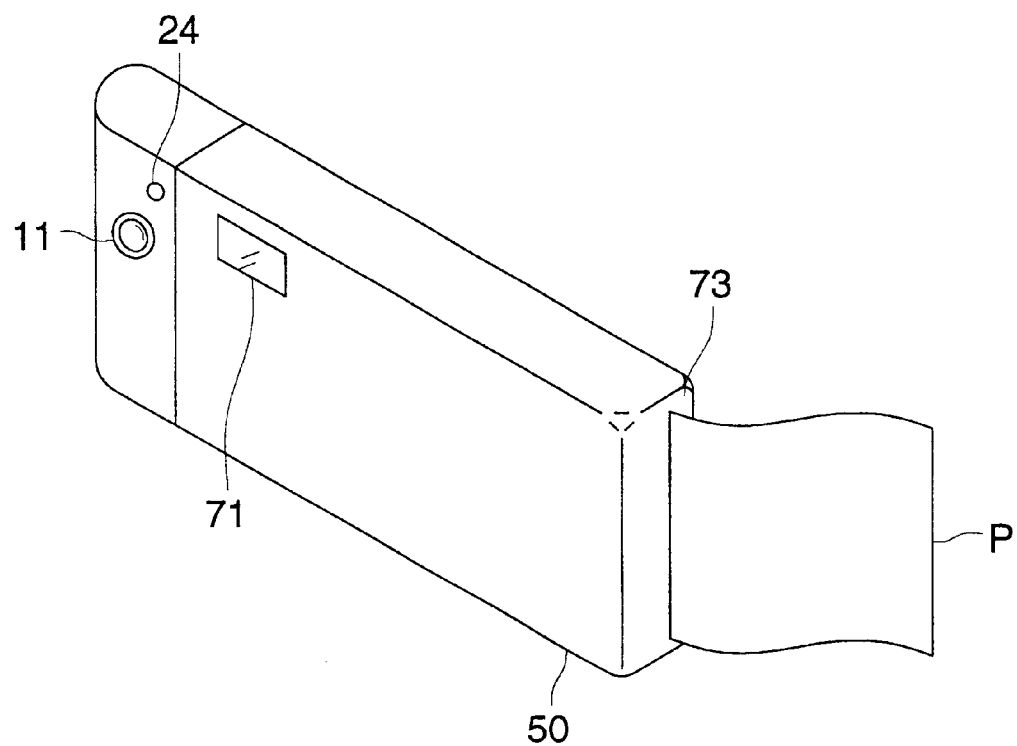
FIG. 4 is a perspective view of the print section 50.

FIG. 2(a) is a perspective view showing the image capturing and printing apparatus according to the present embodiment, and FIG. 2(b) is a view in which the structure in FIG. 2(a) is cut by the IIB—IIB line, and viewed in the arrowed direction. FIG. 3 is a perspective view of the electronic camera section 10, and FIG. 4 is a perspective view of the print section 50 combined with the electronic camera section 10. The electronic camera section 10 is formed in the so-called grip-shape which can be held by the operator's hand, and on the front shown in FIG. 3, it has a lens 11 and a viewfinder window 24, and on the rear shown in FIG. 2(a), it has a release button 23 and a finder view port 25.

Further, the electronic camera section 10 is provided with the plate-shaped engagement section 27 which is extendedly protruded from its side surface. On the leading edge of the engagement section 27, many independent contact piece portions 27a are formed, and these contact piece portions 27a structure a portion of the signal I/F section 16 shown in FIG. 1.

On the one hand, the print section 50 is provided with a large LCD 68 on the upper surface (rear surface), and has a slot-shaped engagement receiving section 69 on its side surface. As shown in FIG. 2(b), on the bottom portion of the engagement receiving section 69, a pin portion 69a which is a portion of the signal I/F section 52 shown in FIG. 1, is formed being opposite to the contact piece portion 27a. When the engagement section of the electronic camera section 10 is inserted into the engagement receiving section 69 of the print section 50, the electronic camera section 10 and the print section 50 are mechanically engaged together, and the contact piece portion 27a and the pin portion 69a are electrically connected to each other, thereby, the camera CPU 20 and the printer CPU 60 can communicate with each other through the signal I/F sections 16 and 52 in FIG. 1. Incidentally, the shape of the engagement section 27 is preferable when it is the same as the shape of the PC card, however, it is not limited to this.

The print section 50 has an engagement lock member 70 on its bottom surface in the vicinity of the engagement receiving section 69, and after the engagement section 27 and the engagement section 69 are engaged with each other, these are locked, thereby, their careless separation is inhibited. Incidentally, because the structure of the engagement lock member 70 is well known, its detailed description is neglected, but when the engagement lock member 70 is moved such that it is separated from the electronic camera section 10, the lock is released. Thereby, because a release signal showing that the engagement lock is released, is outputted from an engagement switch 61 shown in FIG. 1, the printer CPU 60 can interrupt the communication through the signal I/F section 52 in which there is a possibility that error is caused.

Further, the print section 50 has a strobe 71 facing the front in FIG. 4 and a print sheet feed and delivery port 73 on the side surface. When the user inserts the print sheet P from the print sheet feed and delivery port 73 by hand-feeding, the insertion of the sheet is detected by a sensor 64 to detect the insertion of the print sheet P, and in order to conduct the head-up of the print sheet P, the print sheet P is fed to a predetermined position for printing by using the sheet feed sensor 62.

An LCD 68 of the print section 50 shown in FIG. 2(a) can display the image in real time under the control of a video controller 55, under the condition that the electronic camera section 10 is attached, according to the signal from its CCD 13. The print section 50 is so-called touch panel type, and because a signal corresponding to the position information on the LCD 68 contacted by, for example, a touch pen, is inputted into the printer CPU 60 by a touch panel sensor 55b, by pressing an icon 68a displayed on the LCD 68, a corresponding command is inputted into the printer CPU 60.

Next, referring to FIG. 1 to FIG. 4, the operation of the present embodiment will be described. Initially, although the electronic camera section 10 can conduct photographing even when the cable is a single wire, herein, it is assumed that the photographing is conducted under the condition that the electronic camera section 50 is attached to the print section 50. The photographer takes a picture with viewing into the finder view port 25 shown in FIG. 2(a), or with observing the photographic object image displayed on the LCD 68, presses an icon 68a corresponding to the release by the touch pen TP.

In such the case, the signal corresponding to the position information of the release icon from the touch panel sensor 55b is inputted into the printer CPU 60, and the printer CPU 60 detects that the release is operated. Then, corresponding to this ON operation of the release, the printer CPU 60 gives the image capture command to the camera CPU 20 through the communication, and the camera CPU 20 receives this image capture command, and conducts taking-in setting of the high quality image to the color signal processing section 15 and the CDS/AGC section 14, thereby, the CCD 13 driven by the CCD drive circuit 21 by using the timing pulse outputted from the color signal processing section 15 converts the optical image formed by the lens 11 into the analog signal, and the CDS/AGC section 14 converts the analog signal from the CCD 13 into the digital signal after conducting a predetermined pre-processing, and the output signal from the CDS/AGC section 14 is converted in the color signal in the color signal processing section 15, and outputted to the signal I/F section 16 as the image signal. The signal I/F section 16 temporarily accumulates this image signal in the buffer 17, and when it is directly sent to the printer and is printed, outputs the image signal to the print section 50 controlling the interface timing, or when the internal memory 18 of the electronic camera section 10 is selected as the memory storage medium, such image signal is stored in the internal memory 18 through the CPU bus by using, for example, the DMA transfer function of the CPU.

Further, when the camera side release switch 23 is pressed, the signal is inputted into the camera CPU 20, and the camera CPU 20 detects that the release operation is conducted. Herein, when the electronic camera section 10 independently operates, the camera CPU 20 conducts the same operation as the above control, corresponding to the operation in which the release is pressed, and accumulates the image in the internal memory 18. On the one hand, when the electronic camera section 10 is engaged with the print section 50, the camera CPU 20 transmits the situation that the release operation is conducted, to the printer CPU 60 through the communication. Thereby, the printer CPU 60 can detect that the release button of the electronic camera section 10 is pressed, and executes the same operation as the operation when the release ON situation is detected, and directly transfers the captured image into the print section, or stores it into the camera side internal memory.

In the case where the print is desired, when the icon 68a to specify the print is pressed by, for example, the touch pen TP, the image signal stored in the internal memory 18 of the electronic camera section 10, or the image signal directly transferred from the buffer 17, is appropriately transmitted to the print section 50 side through the signal I/F sections 16 and 52. At this time, the buffer 17 temporarily stores the image signal to absorb the difference of the transfer speed. The image-signal transmitted to the printer 50 side, is stored in the memory RAM 53, and waits the print operation.

The print operation is executed by the program stored in the memory ROM 54. Initially, the data conversion for the print of the image signal is conducted. For example, when the data sent from the electronic camera section 10 is sent in the YUV 4:2:2 type, and the ink ribbon (not shown) of the printer is structured by YMC, the edge emphasis correction corresponding to the resolution of the electronic camera section 10 and the resolution of the print section 50 in the YUV color space, is conducted, and next, the image of the YUV 4:4:4 is formed from the sampling image of the YUV 4:2:2. Further, the color space conversion from the YUV color space to the YMC color space and the color serialization to component interleave are conducted, and the gradation correction corresponding to the gradation characteristics of each of YMC colors of the printer is conducted. Further, the correction corresponding to the temperature accumulation characteristics by heating characteristic of the line direction of the thermal head 56a may be conducted. Incidentally, when the number of captured pixels of the electronic camera section 10 and the number of print pixels of the print section 50 are different, the conversion of the image size is conducted by using the interpolation processing or the like. Further, herein, all of the captured data of the electronic camera section 10 are transferred once onto the RAM 53, and then, processing is conducted, however, in order to reduce the image buffer area of the memory RAM 53 and to reduce the cost, the above image processing can also be conducted by time division with the taking-in operation of the image from the electronic camera section 10.

Next, the printer CPU. 60 drives the motor 65a by the motor driver 65, and conducts the head-up of the ink ribbon while detecting the detection signal of the ribbon sensor 62, detects the insertion of the print sheet P which is hand-fed from the print sheet feed and delivery port 73 by the sensor 64, feeds the print sheet P to a predetermined position for printing by using the sheet feed sensor 62 to conduct head-up of the print sheet P, and at the time when the head-up of the print sheet P has been completed, presses the line thermal head 56a onto the ink ribbon by the motor driver 67, and closely contacts the ink ribbon onto the print sheet P. Next, according to the detection signal from the thermister 56b to detect the temperature of the line thermal head 56a, while the printer CPU 60 is conducting the energy supply correction of the line thermal head 56a for each line of each color of YMC through a energy supply control section 56, the printer CPU 60 outputs the previously obtained the data for the print to the current applying control section 56. In this case, in order to decrease the peak current supplied to the line thermal head 56a, there is a method such as time division drive or the like, however, because it is no relationship to the present invention, it will not be described. When the print of one line is completed, the motor 65a is driven by the motor driver 65 and the ink ribbon (not shown) is appropriately supplied, and while the motor 65a is driven by the motor driver 65 and the print sheet P is appropriately supplied, the ink is transferred onto the print sheet P and the print is formed. When one of each color of YMC has processed, as described above, the line thermal head 56a is separated from the ink ribbon by the motor driver 65, and the motor 65a is driven by the motor driver 65, and the ink ribbon is fed to the next color ink position while the detection signal of the ribbon sensor 62 is detected, and in order to conduct again the head-up of the print sheet P, the sheet feed sensor 62 is used, and the print sheet P is fed to a predetermined position for the print, and at the time when the head-up of the print sheet P is completed, the line thermal head 56a is closely contacted again to the ink ribbon by the motor driver 67, and the print of each color is appropriately repeated. According to that, when the print of the desired image is completed, the printed image is delivered from the print sheet feed and delivery port 73.

In the present embodiment, the operator itself conducts hand-feeding to the print sheet feed and delivery port 73 shown in FIG. 4, however, when there is no print sheet P in the print sheet feed and delivery port 73, by detecting the output signal from the sheet feed sensor 62 by the printer CPU 60, the print operation can be stopped. On the one hand, when the ink ribbon is used to the end, the printer CPU 60 detects the end mark of the ink ribbon through the ribbon sensor 62, and the printer CPU 60 can stop the print operation. Incidentally, the automatic sheet feed mechanism and the delivery port may be provided in the print sheet feed and delivery port 73.

In the present embodiment, because the electronic camera section 10 and the print section 50 can be integrated or separated through the engagement section 27 and the engagement receiving section 69, when the electronic camera section 10 is separated, the portability can be secured, and on the one hand, when the electronic camera section 10 and the print section 50 are integrated, the print can be conducted at the place where the photographic object image is captured.

Further, in the present embodiment, the electronic camera section 10 can conduct the release operation corresponding to either one of the release switch 23 of the electronic camera section 10 or the press position signal of the icon corresponding to the release operation inputted from the touch panel sensor 55b of the print section 50. That is, as described above, because the printer CPU 60 can start the electronic camera section 10 through the communication with the camera CPU 20, even when the electronic camera section 10 is in the sleep condition, the print section 50 starts it, and can transmit the image capture command according to the release corresponding signal from the touch panel sensor 55b to the electronic camera section 10 side. According to such the structure, even when the an expensive LCD is not provided in the electronic camera section 10, when the operator conducts photographing while viewing the display on the LCD 68 of the print section 50, the problem of parallax can be avoided, and further, because the print image of the captured image can also be confirmed on the LCD 68, the structure of the electronic camera section 10 can be simply structured at the lower cost. Incidentally, the release operation according to the release corresponding signal from the touch panel sensor 55b of the print section 50 is effective in the software of the CPU 60 only when the electronic camera section 10 and the print section 50 are integrated.

Further, by using the timer (not shown) housed in the printer CPU, when either one of the release witch 23 or the press position signal of the icon corresponding to the release operation inputted from the touch panel sensor 55b, outputs the release signal, at least for a predetermined period, the electronic camera section 10 can inhibit that the printer CPU 60 transmits the image capture command to the camera CPU 20 of the electronic camera section 10 or starts the print operation, so that the image capturing or the print operation is not conducted corresponding to the release signal of the release switch of the other unit, thereby, the possibility of the careless operation of the release switch 23 or the release icon of the touch panel sensor 55b is suppressed, and miss-photographing and the unnecessary printing accompanied by it can be prevented.

Further, while the print section 50 conducts the print operation, it is considered to inhibit that the printer CPU 60 sends out the image capture command to the camera CPU 20, so that the electronic camera section 10 is not operated corresponding to the release operation from either one of the release switch 23 or the press position signal of the icon corresponding to the release operation inputted from the touch panel sensor 55b, thereby, the insufficient print according to the excess of the power consumption in which the image capturing operation starts in addition to the printing operation, is prevented, and a problem of the insufficient memory capacity of the memory RAM 53 assumed when the print and the image capturing are conducted in parallel to each other, can be avoided, and it can also be avoided that the bad effect of the noise from the print section 50 is affected on the CCD 13.

Further, when the electronic camera section 10 is connected to the print section 50, it may be allowed that the release operation is conducted corresponding to only the release operation from either one of the release switch 23 or the press position signal of the icon corresponding to the release operation inputted from the touch panel sensor 55b, thereby, the useless photographing according to unintentional operation of the release switch can be avoided.

Further, either one of the release switch 23 or the press position signal of the icon corresponding to the release operation inputted from the touch panel sensor 55b, is selected by a combination of, for example, the icon 68a displayed on the LCD 68 and the touch panel sensor 55b as a selection means, and only the release signal from the selected release switch can also be received by the printer CPU 60, thereby, because the image capturing can be conducted corresponding to only the release signal of the release switch which is the operator's intentional one, it is convenient.

Further, according to the present embodiment, for example, by pressing a predetermined icon 68a of the LCD 68, the location in which the image signal is stored, can be set to either one of the internal memory 18 or the memory RAM 53, by selecting on the touch panel sensor 55b. In this case, for example, when the memory having the larger storage capacity is selected, and the image signal is stored in it, it can be suppressed that the storage capacity of the memory is insufficient, and the image signal can not be stored. Alternatively, the arrangement in which the image signal whose recorded data is different, is stored in a specific memory according to the date, can be easily conducted.

Further, when a comparison selection means for comparing the remaining storage capacity of the internal memory 18 and the memory RAM 53, and for selecting either one memory according to the comparison result, and storing the image signal in the selected memory, is provided, it can be suppressed that the storage capacity of either one memory is insufficient and the image signal can not be stored.

Further, for example, when the camera CPU 20 or printer CPU 60 automatically selects the memory having the larger remaining storage capacity in the internal memory 18 or the memory RAM 53, the more image signals can be stored without troubling the operator.

Incidentally, in order to select either one of the internal memory 18 or the memory RAM 53, the LCD 68 and the touch panel sensor 55b are used, however, the present embodiment is not limited to this, the inherent switch may be provided on the electronic camera section 10 or the print section 50.

Further, it can also be considered that the remaining storage capacity of the internal memory 18 and the memory RAM 53 is compared to a predetermined value, and an alarm unit to give an alarm, when the storage capacity is not more than the predetermined value, is provided. Thereby, it can be suppressed that the remaining storage memory of the storage means is insufficient while the operator is not aware of it, and the image capturing can not be conducted.

In such the case, the alarm unit can conduct the alarming by visually displaying a massage (the storage capacity is insufficient), or an illustration showing an error, or may conduct the alarming by sounding a buzzer or voice, or may also generate the oscillation depending on the case, however, the alarm unit is not limited to this, and it is enough when the alarm unit is provided at least in either one of the electronic camera section 10 or the print section 50.

Figure 5:
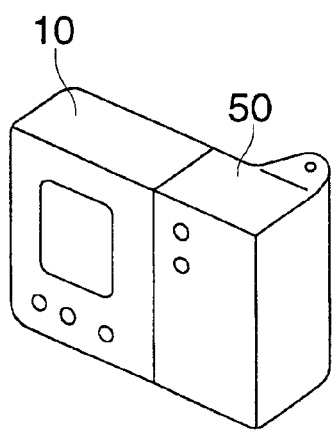
FIGS. 5(a) and 5(b) are views showing a modification example of the present embodiment.
Figure 5:
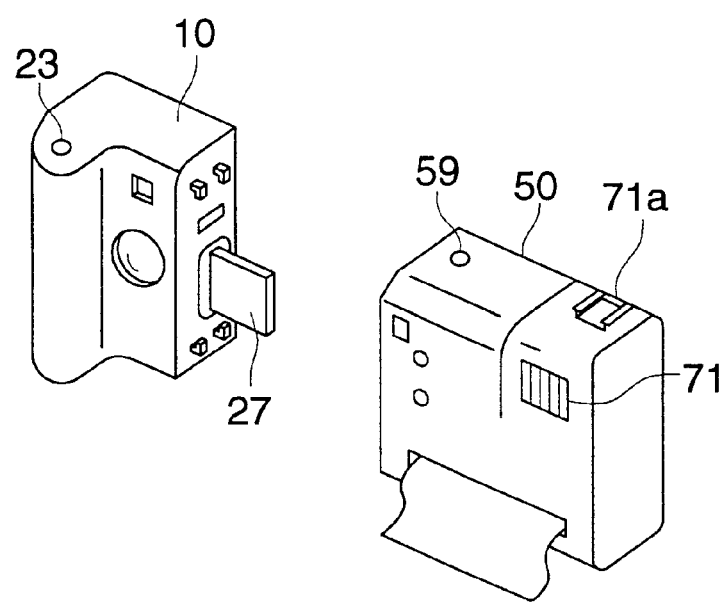
Figure 18:
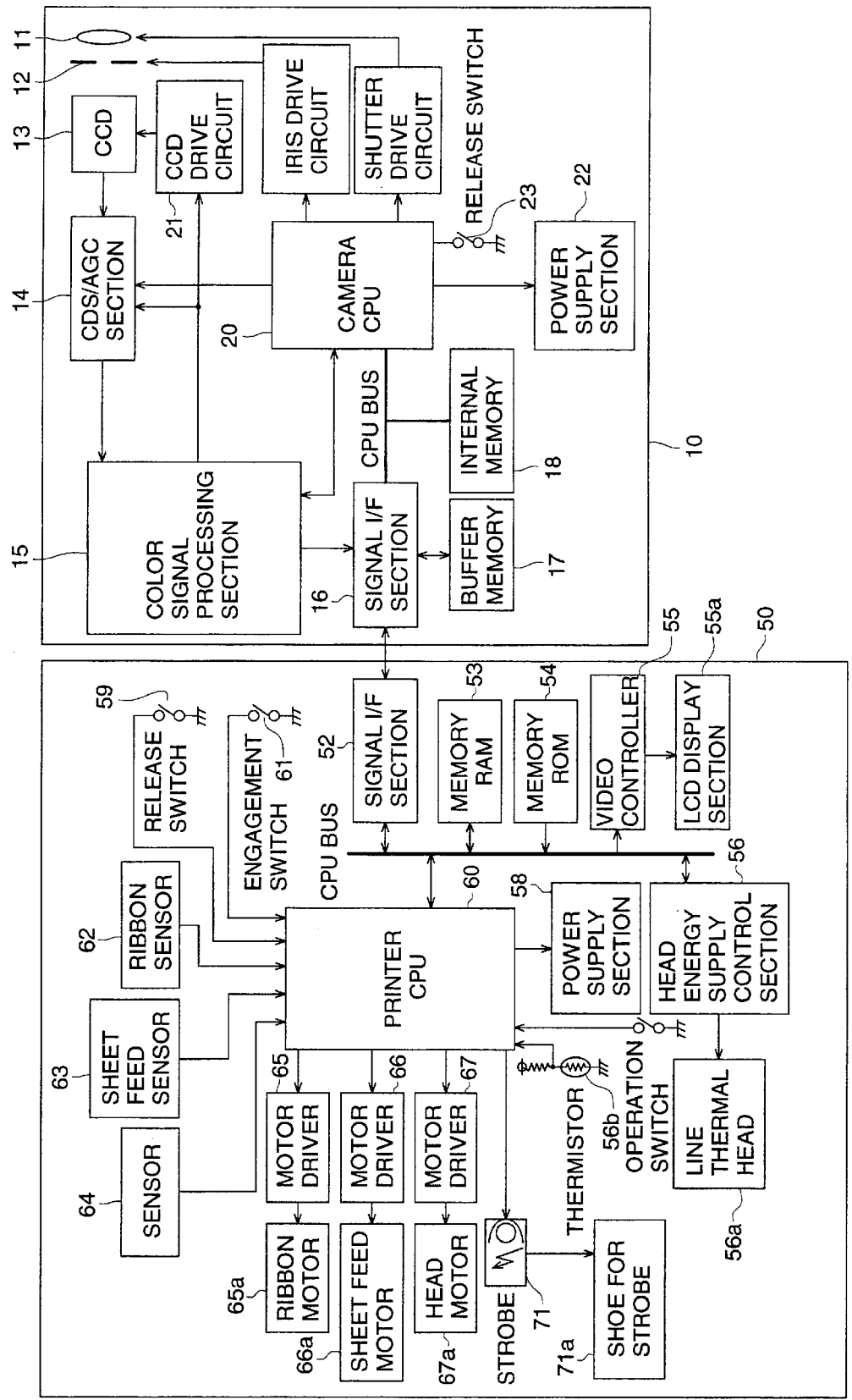
FIG. 18 is a circuit block diagram of the embodiment shown in FIG. 5.

FIG. 5 is a view showing an example of modification of the present embodiment, FIG. 5(a) is a view showing an image capturing and printing apparatus in which an electronic camera section and a print section are integrated, and FIG. 5(b) is a view showing a situation in which the electronic camera section and the print section are separated from each other. Such the structure is different from the structure shown in FIG. 2 to FIG. 4 in the point in which the touch panel sensor of the print section is removed, and an operation button is used, and the sheet feed and delivery direction of the print section is different, and the a strobe shoe is added to the print section. The electric block diagram of the structure in this structure is shown in FIG. 18.

According to the present embodiment, a strobe 71 is provided on the front surface of the print section 50. The strobe 71 emits the light being interlocked with the operation of a release button 59 of the print section 50 or a release button 23 of the electronic camera section 10.

Generally, because the print section 50 needs the larger electric power than the electronic camera section 10, the print section has the power supply for this purpose. Accordingly, as in the present embodiment, when the strobe 71 which needs the large electric power to some extent for light emission, is provided on the print section 50, the structure of the electronic camera section 10 can be made to be smaller and simpler, and its power saving can be attained. Incidentally, on the print section 50, together with the strobe 71, or instead of it, a strobe shoe 71a which is a strobe attachment means for connecting to an external strobe, can be provided.

Figure 6A:
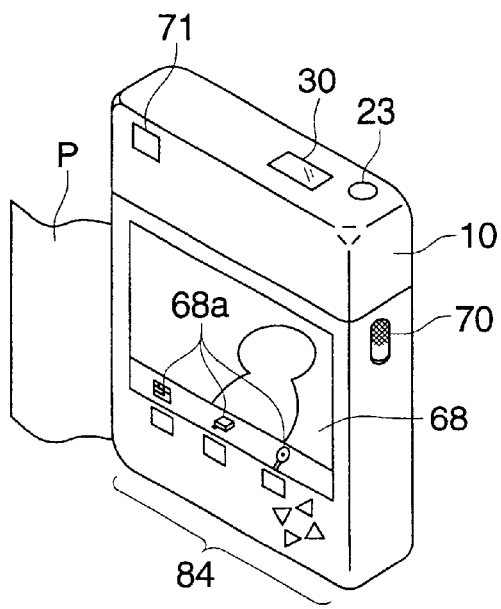
FIGS. 6(a) and 6(b) are views showing the image capturing and printing apparatus according to another modification example of the present embodiment.
Figure 6B:
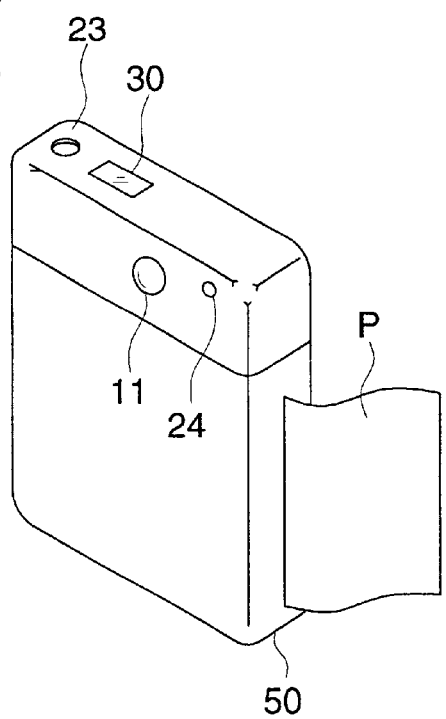
Figure 6C:
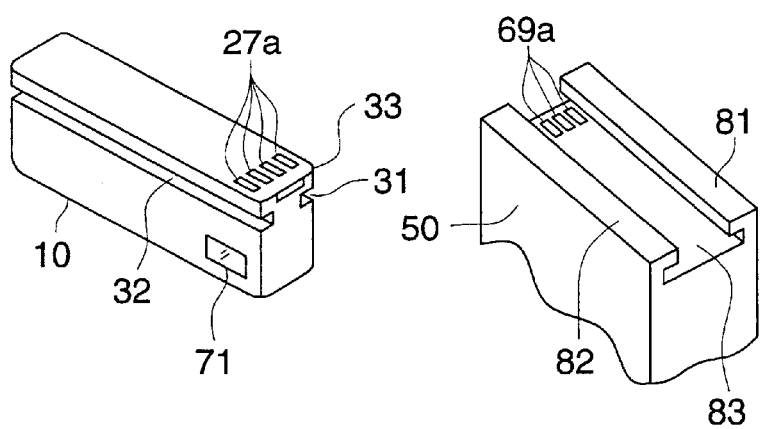
FIG. 6(c) is a perspective view showing the lower surface of the electronic camera section, and the upper surface of the print section.

FIG. 6 is a view showing the image capturing and printing apparatus according to another example of modification of the present embodiment, FIG. 6(a) is a perspective view showing the rear surface, FIG. 6(b) is a perspective view showing the front, and FIG. 6(c) is perspective views respectively showing the lower surface of its electronic camera section, and the upper surface of the print section.

The basic structure of the present modified example is the same as the above embodiment, and the parts having the same functions are denoted by the same numerals, and their explanation is omitted. Incidentally, in the present modified example, different from the above embodiment, on the upper surface of the electronic camera section 10, a status LCD 30 displaying the photographing mode and the number of image capturing is provided, and on its rear surface, an operation button 84 to mechanically select the operation icon 68a of the LCD 68, which is not the selection in the software of the touch panel type, is provided.

In FIG. 6(c), on the front upper edge and rear upper edge of the print section 50, a par of engagement receiving sections 81 and 82, which are opposed to each other and formed into the inverse L letter-shaped, are formed. An engagement groove 83 is formed between the engagement receiving sections 81 and 82. A contact point 69a is formed on one end of the bottom surface of the engagement groove 83. On the one hand, on both sides in the vicinity of the lower surface of the electronic camera section 10, grooves 31 and 32 are formed, thereby, the lower portion of the electronic camera section 10 forms almost T letter-shaped engagement section 33. A contact point 27a is formed on the one end of the bottom surface of the engagement section 33.

On the erected condition of the electronic camera section 10, while the engagement section 33 is being engaged with the engagement groove 83, the electronic camera section 10 is moved in the direction shown in FIG. 6(c) to the upper surface of the print section 50, thereby, the electronic camera section 10 is mechanically engaged with the print section 50. When the engagement is completed, the electronic camera section 10 and the print section 50 are mechanically combined, and the contact points 27a and 69a are electrically connected to each other, thereby, the camera CPU 20 and the printer CPU 60 are communicable with each other, through the signal I/F sections 16 and 52 in FIG. 1.

Incidentally, in the above embodiment, the electronic camera section is made simple and low cost, and the print section side is made multi-functions. In contrast to this, in the following embodiment, the electronic camera section side has the more common structure of the electronic camera, and the print section is made to be simple and low cost, and the electronic camera section is made to be the more multi-functions.

Figure 7:
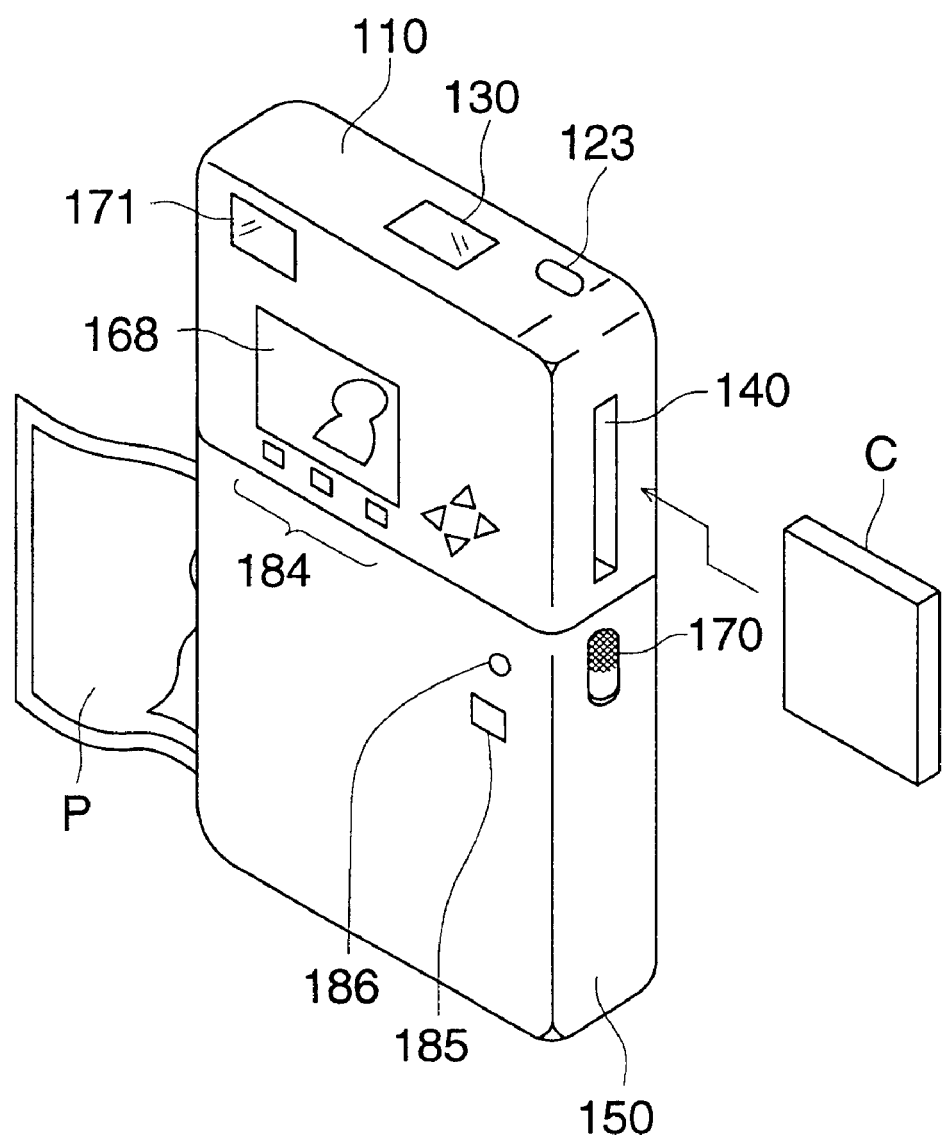
FIG. 7 is a view showing the structure of the external view of the image capturing and printing apparatus according to the second embodiment.

FIG. 7 is a view showing the structure of the external view of the image capturing and printing apparatus according to the second embodiment. Such the structure is very similar to the structure shown in FIG. 6, however, it is largely different in the point that, in order to make an electronic camera section 110 side the more multi-functions, an LCD 168 and an operation button 184 are position-changed from a print section 150, and an insertion port 140 of a CF card C is provided. Incidentally, in the print section 150, a power supply switch 185 is arranged below an LED 186 showing turning-on of the power supply switch, however, this may be used also for an engagement lock 170, and when the engagement lock is conducted, the power supply may also be tuned ON at once.

Concerning respective operations of the electronic camera section 110 and the print section 150, because these are the same as the conventional technology or the above embodiment, the description will be omitted.

Figure 8:
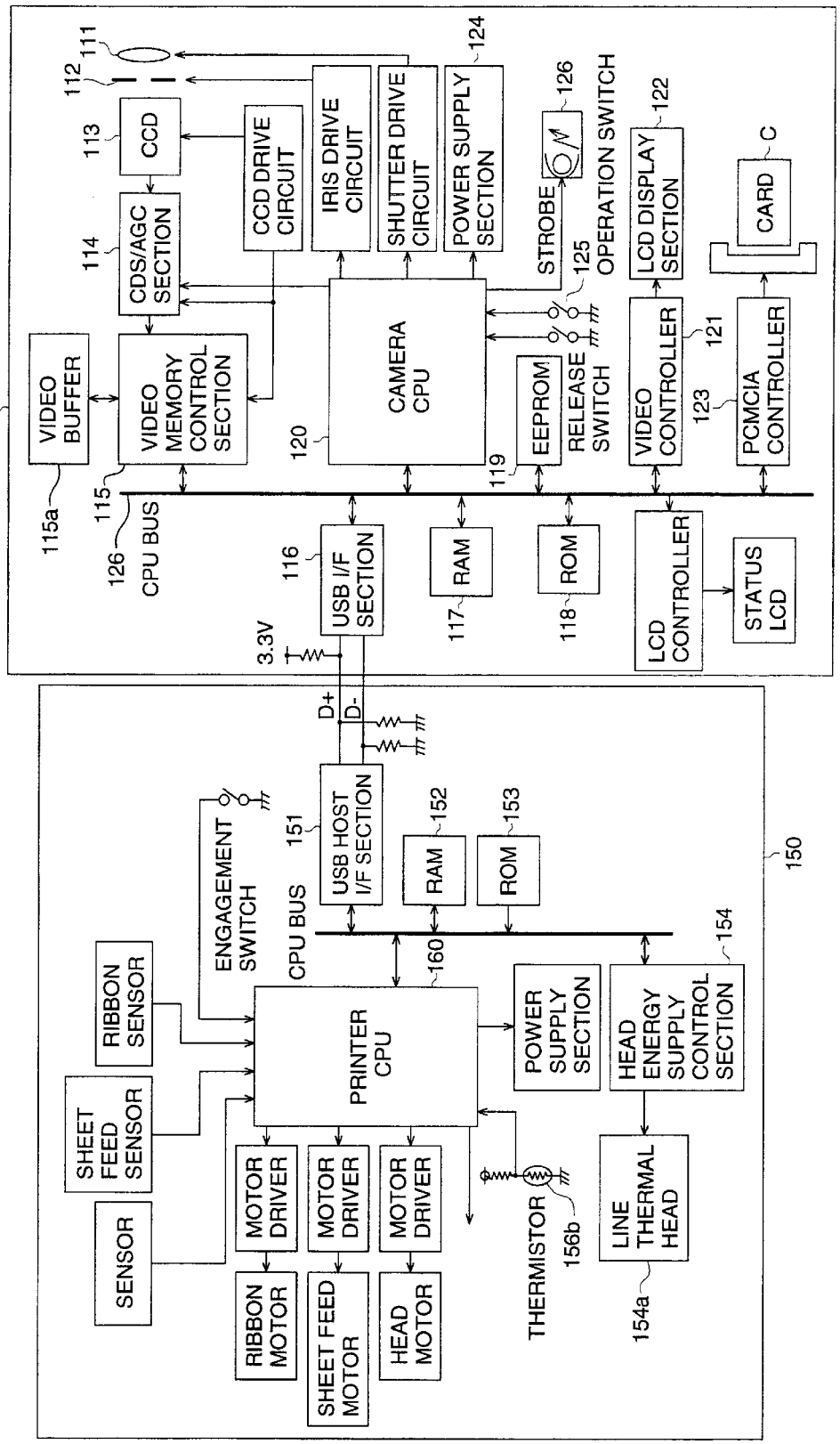
FIG. 8 is a block diagram showing a structure of the image capturing and printing apparatus composed of an electronic camera section 110 and a print section 150 according to the second embodiment.

FIG. 8 is a block diagram showing the image capturing and printing apparatus composed of the electronic camera section 110 and the print section 150 according to the second embodiment. In FIG. 8, the electronic camera section 110 has: a lens 111; a CCD 113 as an image pick-up means for converting an optical image formed by a diaphragm 112 into an analog signal; a CDS/AGC section 114 by which, after a predetermined pre-processing is conducted on the analog signal from the CCD 113, the pre-processed image signal is converted into a digital signal; a video memory control section 115 which controls a video buffer 115a by using a timing pulse generated in the CCD drive section in order to temporarily store the output signal from the CDS/AGC section 114, and has the control function to output the output signal from the CDS/AGC section 114 stored in the video buffer 115a to the camera CPU 120 corresponding to the access from the camera CPU 120; a USB I/F section 116; a RAM 117 to temporarily hold the data to execute the program on the electronic camera side, and to temporarily hold the image signal to make the print data; a ROM 118 to hold the program itself or constant value; an EEPROM 119 to hold the program for functional extension of the electronic camera, or to hold the image signal in which some images are captured, for example, even when there is not the external memory card such as a CF card C; a video controller 121 to control an LCD display section 122; a PCMCIA controller 123 by which the data can be stored and restored on, for example, the CF card C; a strobe 126; and a camera CPU 120 connected to electrically control these camera operations. Incidentally, the video memory control section 115, USB I/F section 116, RAM 117, ROM 118, EEPROM 119, video controller 121 to control the LCD display section 122, PCMCIA controller 123, and camera CPU 120 are interconnected by the camera CPU bus 126.

Further, the electric power is supplied from the power supply section 124 to the camera CPU 120, and the signal from the operation switch 125 as the user interface, is inputted into the camera CPU 120, and the camera CPU 120 controls the light emission of the strobe 126.

On the one hand, in the present embodiment, the print section 150 provided with the a thermal sublimation type printing means has: the USB host I/F 151 to communicate with the external; a memory RAM 152 to temporarily hold the data to execute a program or to temporarily hold the image signal to make the print data; a memory ROM 153 to hold the program itself or constant values; a video controller 55 having the LCD display section 55a; and a head energy supply control section 154 to electrically control the supply energy to a thermal head 154a which is a printing means, which are respectively connected to an external printer CPU 160 so as to be controllable through the CPU bus. Incidentally, the head energy supply control section 154 feeds back a correction value of temperature to the line thermal heads 154a through the printer CPU 160 according to the detection signal from a thermister 156b to detect the temperature of the thermal heads 154a. Incidentally, this CPU 160 is so-called a multifunction CPU, and has an AD conversion function to digitize the temperature signal from the thermister 156b or the analog signal inputted from a touch panel sensor in the inside, and a timer function to execute the program in the inside, however, because the multifunction CPU having these functions is widely known, it will not be described herein. Further, description of the other structure, which is common to the embodiment in FIG. 1, will be neglected also.

The characteristic of the present embodiment is that: because the electronic camera section 110 and the print section 150 are connected through a widely used USB interface, these can be connected to the external equipments of interest, which have such the USB interface.

Incidentally, even when these can be mechanically connected, when, for example, an image file format which is individually used, is different, it will occur that the image signal transferred from the connected equipment cannot be confirmed. Further, even when the connected equipment is a printer having the same function, it is sometimes necessary that the color matching is changed for each printer.

Accordingly, in the present embodiment, when these equipments are connected through the USB interface, initially, the CPU structured in the host side equipment communicate s to the CPU embedded in the connected equipment, and grasps the kind or characteristics of the connected equipment, then, selects the setting appropriate for the function of the host side from the characteristics of the connected equipment, and conducts the data transmission. Specifically, in the present embodiment, the print section 150 has the host function of the USB, and the electronic camera section 110 is structured as the connected equipment.

Initially, when the electronic camera section 110 is connected to the print section 150, the power supply is supplied from the print section 150 to the electronic camera section 110 side through the USB interface. In the electronic camera section 110, the power supply supplied from the print section 150, is used only for connection detection of the USB I/F section 116, and for the other section, the power supply on the electronic camera section side is used. When the power supply is supplied from the print section 150 to the electronic camera section 110, the USB I/F section 116 detects that the connection is conducted through the USB, and the connection is transmitted to the camera CPU 120, by using, for example, an interruption signal, or the like. Further, in the print section 150 as the host side, it is detected that, on the electronic camera section 110 side, one of the USB data signal lines is pulled up to 3.3 V by using the resistor, which is made from the power supply supplied from the print section 150 side, thereby, it is detected that the external equipment is connected to the USB, and the synchronized signal which is called Start Of Frame (hereafter, SOF) is provided. By this synchronized signal, in the electronic camera section 110, the communication through the USB can be conducted.

After a predetermined time has passed, the printer CPU 160 as the host side, at the default address of the USB, requests Device Descriptor to the camera CPU 120, through the USB host I/F section 151 on the print section 150 side and the USB I/F on the electronic camera section 110 side, and the camera CPU 120 answers that it is the specific electronic camera section 110, to the printer CPU 160, as the response of Device Descriptor, by inversely tracing the above paths. When the printer CPU 160 receives the Device Descriptor, the printer CPU 160 detects that the connected equipment is the electronic camera section 110, and selects the control method appropriate for the electronic camera section 110, and by using the new USB address other than the USB default address, responds to the camera CPU 120 with Configuration Descriptor. The Printer CPU 160 receives Configuration Descriptor, the printer CPU 160 can notice the interface setting condition of the USB of the electronic camera section 110, and sets a predetermined Configuration, which is exclusively used for the interface of the print section 150 and the electronic camera section 110, to the camera CPU 120.

According to the above, the print section 150 and the electronic camera section 110 can respectively notice the connected equipment, and can use the image processing content or data format structure corresponding to the connected equipment, the communication command for the equipment itself, or the image size, or the like. More specifically, the electronic camera section 110 changes the interpolation processing method of the change of the image size which can be inputted into the print section 150, corresponding to the image size in which the electronic camera section 110 can output, or executes the interpolation processing of the change of the image size outputted in the electronic camera section 110 corresponding to the image size which can be inputted into the print section 150.

Further, when the personal computer and the electronic camera section 110 are connected, because the electronic camera section 110 operates as the host of the personal computer side, finally by setting the Configuration used for the interface to the personal computer, through the same sequence as the above description, the interface to the personal computer is also established.

Herein, an example in which the USB is used, is shown, however, when it is the interface method by which the negotiation in the communication start between equipments, can be conducted, it is clear that the recognition of both equipments can be made, and the present invention is not limited by the USB itself. The persons skilled in the industry can easily understand that, when, for example, the serial communication represented by RS-232C, or RS-422, and the interface such as IEEE 1394 are used, the same effects can be obtained.

FIG. 9(*a*) is a view showing the characteristic for each connected equipment, to which the electronic camera section. 110 is connected through the USB I/F section 116. Such the characteristic can be previously stored in the ROM 117 as a table. According to FIG. 9(*a*), it is shown that, when the electronic camera section 110 is connected to the printer A, the image file format is the RGB image data, and in the image processing, the sharpness is emphasized, and the color matching A is sued, and the user interface (operation switch 123) of the electronic camera section 110 operates the printer A. On the one hand, it is shown that, when the electronic camera section 110 is connected to the personal computer, the image file format is the JPEG format, and in the image processing, the edge enhancement and the color matching are unnecessary, and the user interface can not be used.

As described above, because the electronic camera section 110 detects which equipment is connected to the USB I/F section 116, and corresponding to the detection result, the image processing, or the like, is changed, for example, the electronic camera section 110 can be connected to the personal computer or another high speed printer, as the external equipments, corresponding to the use, and the format that these external equipments can recognize, can be set, thereby, the higher image processing or the high speed print of the image can be conducted.

Incidentally, in the electronic camera section 1100, a contact pin contacting portion to electrically connected to the print section 150 and the connection portion to electrically connected to the external equipment, are common USB I/F section 116, however, these may be separately provided.

Further, the electronic camera section 110 has the operation switch 125, and according to the detection result, when it is judged that the electronic camera section 110 is connected to the printer A or the printer B, as shown in FIG. 9(*a*), the content of the user interface which is executed according to the operation of the operation switch 123 and the LCD display section 122 is conducted as the processing for the printer A or the processing for the printer B. Further, when it is judged that the electronic camera section 110 is connected to the personal computer as the external equipment, the signal of the operation switch 123 is invalidated.

FIG. 9(*b*) is a view showing the characteristic of the connected equipment connected through the USB host I/F section 151. Such the characteristic can be previously stored in the ROM 117 as a table. According to FIG. 9(*b*), it is shown that, when the print section 150 is connected to the camera A, the file format is the YUV image data of the RAW type, and a order of YYYYUV of YUV 4:2:0, and in the image processing, the edge enhancement is about middle degree, and the number of pixels is 1280×960. On the one hand, it is shown that, when the print section 150 is connected to the camera B, the file format is the YUV image data of the RAW type, and a order of YYUV of YUV 4:2:2, and in the image processing, the edge enhancement is weak and re-size interpolation A is conducted, and the number of pixels is 1600×1200. On the one hand, it is shown that, when the print section 150 is connected to a Flat bed scanner A, the file format is the RGB image data of the Bitmap type, and the RGB 4:4:4 component interleave, and in the image processing, the edge enhancement is not conducted and the re-size interpolation B is conducted, and the median filter processing is conducted, and the number of pixels is 3000×2000×3.

Incidentally, the conventional printer can display the index image plane according to the image signal transferred from the digital still camera, and according to that, the operator can determine the propriety of the print. However, when such the function is provided, the structure of the printer is complicated.

Figure 10:
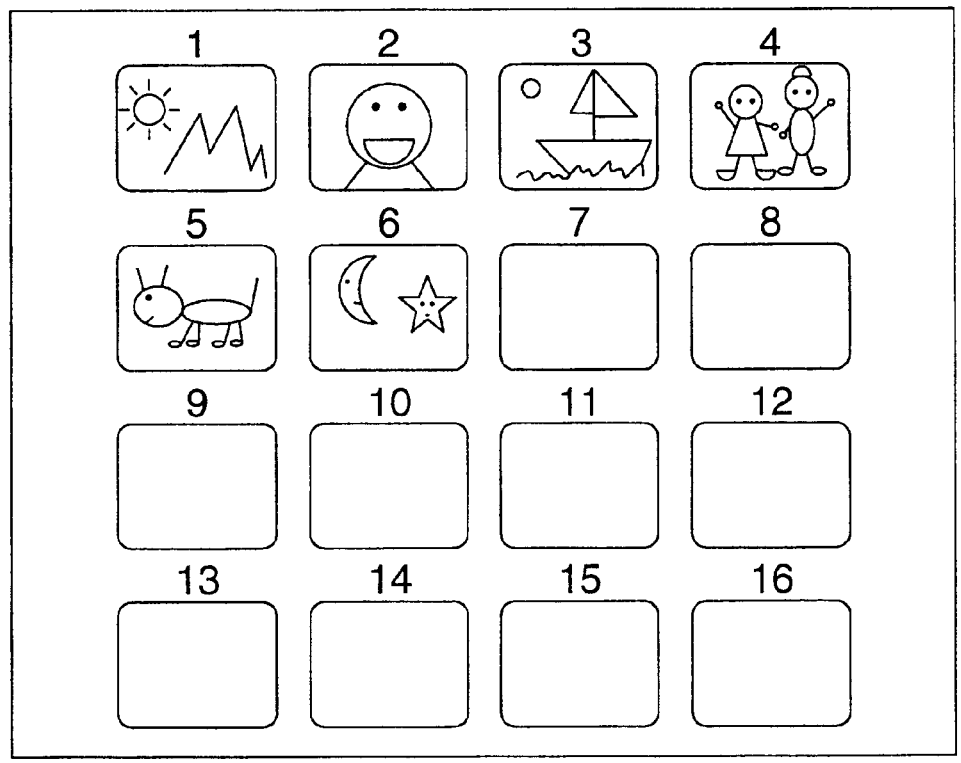
FIG. 10 is a view showing an example of the image plane of an LCD 68 on which an index image is displayed.

In contrast to this, in the present embodiment, because the electronic camera section 110 can generate the image signal of the index image, in the print section 150, the function by which the index image is generated, can be neglected, and the more cost reduction can be achieved. That is, in the electronic camera section 110, when the same photographic object image is captured/taken, the full size image data, and the image data corresponding to a small image which is so-called thumbnail image, can be simultaneously generated by thinning out the signal from such the full size image data, and when each thumbnail image data is displayed on one image area, the index image can be obtained. The thumbnail image data is stored, for example, in a specific area of the RAM 117. An example of the image plane of the LCD 68 on which such index image is displayed, is shown in FIG. 10.

Herein, when the RAM 152 of the print section 150 has an adequately larger storage capacity than the RAM 117 of the electronic camera section 110, even when, after all the image signals saved on the electronic camera section 110 side are transmitted, the printing is conducted, specifically, there is no problem except that it takes the transfer time.

In contrast to this, in order to promote the cost reduction, when the storage capacity of the RAM 152 of the print section 150 is limited (to the degree of one or two sheets of images), it is necessary that, according to the transferred image signal, the image is printed at once, and the image signal corresponding to the image whose printing is completed, is rewritten to the new image signal at any time, and thus, the effective use of the memory RAM 152 is intended. However, in the case where the order is such that the index image plane is finally transferred, when the storage capacity of the RAM is small, the printing of the index image can not be conducted before the printing of individual image, and the improper image is printed, therefore, there is a possibility that the ink ribbon or the print sheets becomes useless. Accordingly, when the remaining storage memory of the RAM 152 is not larger than a predetermined value, for example, the index image is transmitted to the print section 150, and after the propriety of the image is confirmed, by conducting the print, the print can be conducted without uselessness. For example, in the journey, when there is small print source, after the index image is viewed, when the image which is finally printed, is selected, the sheet and ink can be the more economized.

Incidentally, because the priority of image work area in the electronic camera section 110 is high for the image processing, like as the electronic camera section 110 arranges again the image signal read from the CCD 113, in order to reduce the cost, it is allowable that only the volatile memory is used, however, in the print section 150, it is preferable that the non-volatile memory in which the image signal is saved even when the power supply is interrupted, is used. While the image signal is transferred from the electronic camera section 110 to the print section 150, because there is a possibility of an unpresumable trouble that the engagement section is disengaged, it is desirable that the image signal of the index image is transferred with priority. Further, when the index image can be printed, it is not necessary that the LCD for the print image confirmation is provided on the electronic camera section 110 nor the print section 150, and the lower cost structure can be achieved.

Further, in the present embodiment, it may also be considered that, prior to the transfer of the image signal, the information about the image size of the photographic object image is transmitted from the camera CPU 120 to the printer CPU 160. In this case, according to the information about the image size of the photographic object image, when the printer CPU 160 judges that the loaded print sheet P does not correspond to the image to be printed, according to the signal from the sensor 64 to detect the kind of the print sheet, for example, as shown in FIG. 1, the alarm is given, or the like, thereby, the improper print formation can be prevented.

In such the case, the alarm unit can conduct the alarming by visually displaying a massage (the sheet size is improper), or an illustration showing an error, or may conduct the alarming by sounding a buzzer or voice, or may also generate the oscillation depending on the case, however, the alarm is not limited to this.

Further, in the present embodiment, the electronic camera section 110 may process the image signal according to at least two of the print resolution of the print section 150, print image size, and the number of pixels. More specifically, when the resolution or size of the image signal transmitted from the electronic camera section 110 does not correspond to the print sheet P of the print section 150, the image signal is transferred after the image processing is previously conducted in the camera CPU 120 of the electronic camera section 110, and the image appropriate for such the print sheet P may be printed. Thereby, because the image processing in the print section 150 can be unnecessary, the structure of the print section 150 can be the more simple, and the print speed can be increased.

Further, when the image compression technology which is called Wavelet, is used, the same image can be divided into different hierarchy and transferred. For example, even when the electronic camera section 110 transmits the image signal having the resolution exceeding the resolution set in the print section 150, to the print section 150, there is a problem that, although the image quality of the print is not largely increased, the transmission time is prolonged. Accordingly, by using the Wavelet technology, when the image signal is made to the hierarchy structure having the different resolution and can be stored in the RAM 117, in the electronic camera section 110, the image signal up to the necessary hierarchy can be transferred. That is, when the hierarchy necessary for the structure of the image signal according to at least two of the print resolution of the print section 150, print image size, and the number of pixels, is transmitted from the electronic camera section 110 to the print section 150, only the image signal necessary for the formation of the image is obtained in the print section 150, and the printing can be started at once, and the transmission time of the image signal can be reduced, and the print speed can be increased. Incidentally, when the degree of fineness is very low, for example, 3 layers of the basic layer, fineness second hierarchy and the fineness third hierarchy may be sent. Further, when the degree of fineness is increased a little, the fineness fourth hierarchy in addition to the basic layer, fineness second hierarchy and the fineness third hierarchy, may also be transferred. For such the hierarchy division, a method of the image compression by the Wavelet conversion is optimum.

Figure 11:
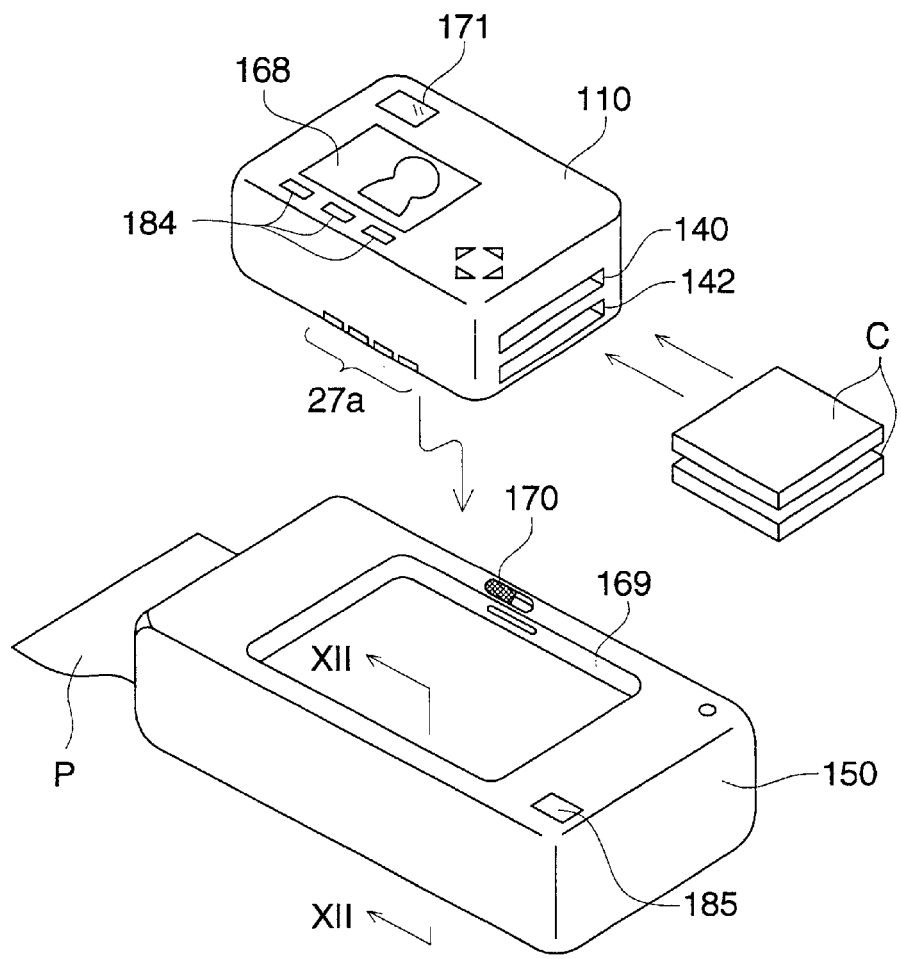
FIG. 11 is a view showing the structure of the external view of the image capturing and printing apparatus according to an modification example of the present embodiment.
Figure 12:
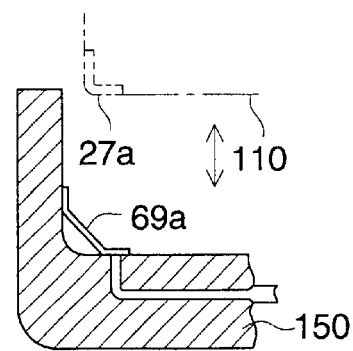
FIG. 12 is a view in which the structure in FIG. 11 is cut by XII—XII line, and which is viewed in the arrowed direction.

FIG. 11 is a view showing the structure of the external view of the image capturing and printing apparatus according to a modified example of the present embodiment. FIG. 12 is a view in which the structure in FIG. 11 is cut by the XII—XII line and viewed in the arrowed direction. Such the structure is basically the same as the structure shown in FIG. 7, but the point that the electronic camera section 110 is installed on the print section 150, and thereby, the connection is conducted, is different. More specifically, the print section 150 has a recessed portion having the same internal shape as the external shape of the electronic camera section 110, that is, the engagement receiving section 169.

When the electronic camera section 110 is inserted and placed in the engagement receiving section 169, the electronic camera section 110 is mechanically locked onto the print section 150 by the function of the engagement lock member 170, and integrated. In this case, the contact point provided on the bottom surface of the electronic camera section 110 is electrically connected to the elastic contact point 69a provided on the bottom surface of the engagement receiving section 169, thereby, the electric current can flow to the camera CPU and the printer CPU, not shown.

Further, in the present modified example, slots 140 and 142 to receive the CF card are vertically arranged and provided on the side surface of the electronic camera section 110. When the electronic camera section 110 is engaged with and placed on the print section 150, the upper slot 140 is exposed, and the lower slot 142 is hidden in the engagement receiving section 169.

According to the present modified example, when the CF cards C are respectively inserted into the upper slot 140 and the lower slot 142, the copy of the data, or the like, can be conducted. Further, when the electronic camera section 110 is engaged with and placed on the print section 150, because only the upper slot 140 is exposed, when the slot 140 is exclusively used for the print data read-out, such a trouble that, in the case of the print, the CF card C is inserted into the slot 142 by mistake, can be prevented. Incidentally, the engagement surface onto which the slot is provided, means, in the present embodiment, when the electronic camera section 110 is engaged with and placed on the print section 150, the surface which is hidden by, for example, the engagement receiving section 169, accordingly, the slot 142 may be provided on the bottom surface of the electronic camera section 110 in FIG. 11.

Respective operations of the electronic camera section 110 and the print section 150 according to the present embodiment, will be omitted, because these are the same as in the conventional technology or the above embodiments.

Incidentally, in order to enable to use the printer in, for example, the outdoor place, it is necessary to depend on the electric power supply mainly from the battery. Such the battery is housed in a specific battery box, and can supply the constant electric power. Incidentally, during printing, when the operator opens the cover of the battery box by mistake, there is a possibility that the battery is out of the place, and the electric power supply is stopped, thereby, the printing fails. According to the following embodiment, such the trouble can be dissolved, or softened.

Figure 13:
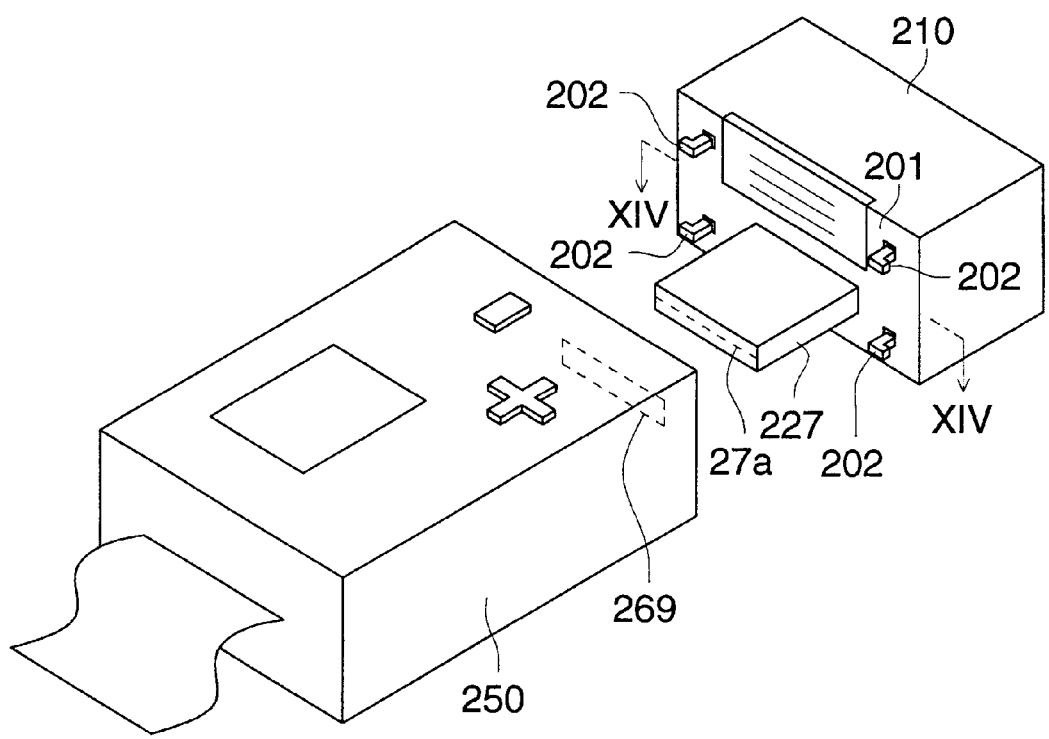
FIG. 13 is a perspective view showing the image capturing and printing apparatus according to the third embodiment.

FIG. 13 is a perspective view showing the image capturing and printing apparatus according to the third embodiment. Because the basic structure is the same as the structure shown in FIG. 1 to FIG. 4, the different point will be mainly described. In FIG. 13, the electronic camera section 210 forms a plate-like engagement section 227 at the center, in the engagement surface 201 to the print section 250. On the one hand, on the periphery of the engagement section 227, engagement claws 202 are formed at 4 positions.

A battery cover 203 is arranged between the upper engagement claws 202. Inside the battery cover 203, a battery box (not shown) in which the battery can be housed, is formed. The electric power from the battery is supplied to the electronic camera section 210 and the print section 250.

The electronic camera section 210 and the print section 250 are engaged by being moved in the arrowed direction in FIG. 13, and at the time, the engagement section 227 of the electronic camera section 210 is engaged with the engagement receiving section 269 of the print section 250, and the contact piece 27a of the engagement section 227 is electrically connected to a pin portion (not shown) of the print section 250, and further, when the engagement claw 202 is engaged into an opposite portion of the print section 250, the mechanical lock is made. When the engagement is completed, because the engagement surface 210 of the electronic camera section 210 is brought into contact with the opposite surface of the print section 250, the battery cover 203 is kept in the condition that it can not be seen from the outside. In this condition, because it can not be considered that the battery cover 203 is taken off by mistake, the electric power supply to the electronic camera section 210 and the printer section 250 can be stably conducted.

On the one hand, when it is necessary to replace the battery, the electronic camera section 210 and the print section 250 are separated from each other, and the replacement may be conducted in the condition that the battery cover 203 is exposed.

Figure 14:
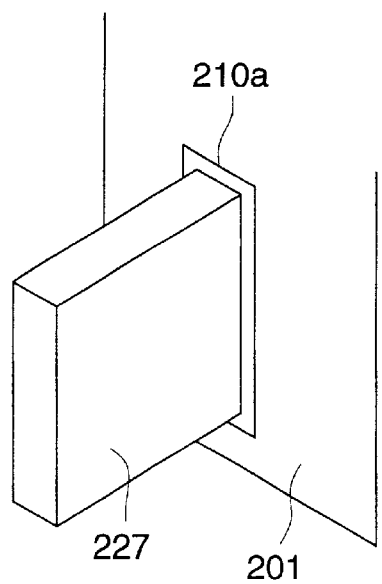
FIGS. 14(a) and 14(b) are views in which the structure in FIG. 13 is cut by XIV—XIV line, and which is viewed in the arrowed direction.
Figure 14:
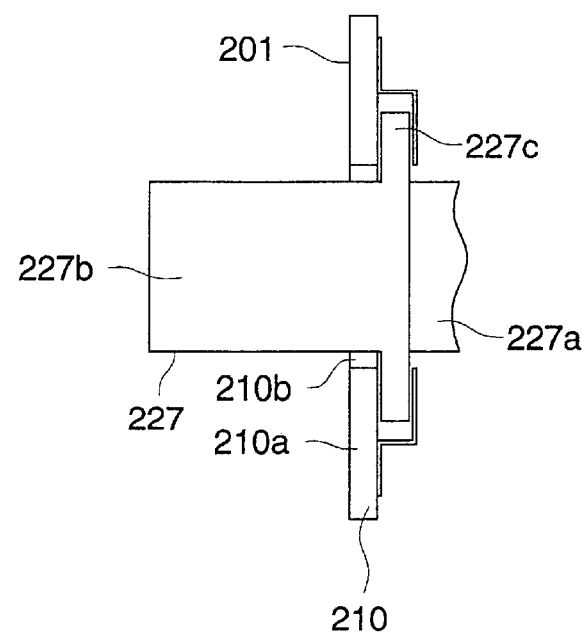

FIG. 14 is a view in which the structure in FIG. 13 is cut by the XIV—XIV line and viewed in the arrowed direction. The engagement section 227 is supported by the case 210a of the electronic camera section 210 by so-called floating structure. More specifically, a rectangular opening 210b is formed in the engagement surface 201 of the case 210a as shown in FIG. 13 and FIG. 14.

The engagement section 227 as shown in FIG. 13 has about T letter-shape composed of the main body 227b and head portion 227c, and a flexible print substrate 227a is attached on the center of the head portion 227c, and the main body 227b protrudes from the opening 210b. Both sides of the head portion 227c are forced by a spring member 204 to the case 210a. Accordingly, the engagement section 227 is held to the case 210a by the predetermined friction force according to the spring force of the spring member 204.

Because the sectional form of the opening 210b is larger than the sectional form of the main body 227b of the engagement section 227, the main body 227b can arbitrarily move in the up and down, left and right directions and in the rotational direction, within the range limited by the opening 210b. As described above, because the engagement section 117 is arranged so as to be arbitrarily moved relatively to the case 210a, even when slippage according to the production error, or the like, is generated between the electronic camera section 210 and the print section 250, when the engagement section 227 relatively moves, because such the slippage can be absorbed, the large stress is not caused on the engagement section 227.

Further, because the engagement section 227 can be relatively moved 2-dimensionally in the surface direction to the engagement surface 201 of the case 210a, and can be rotated around the axis perpendicular to the engagement surface 201, the slippage in various directions, according to the production error, or the like, can be absorbed between the electronic camera section 210 and the print section 250.

Figure 15:
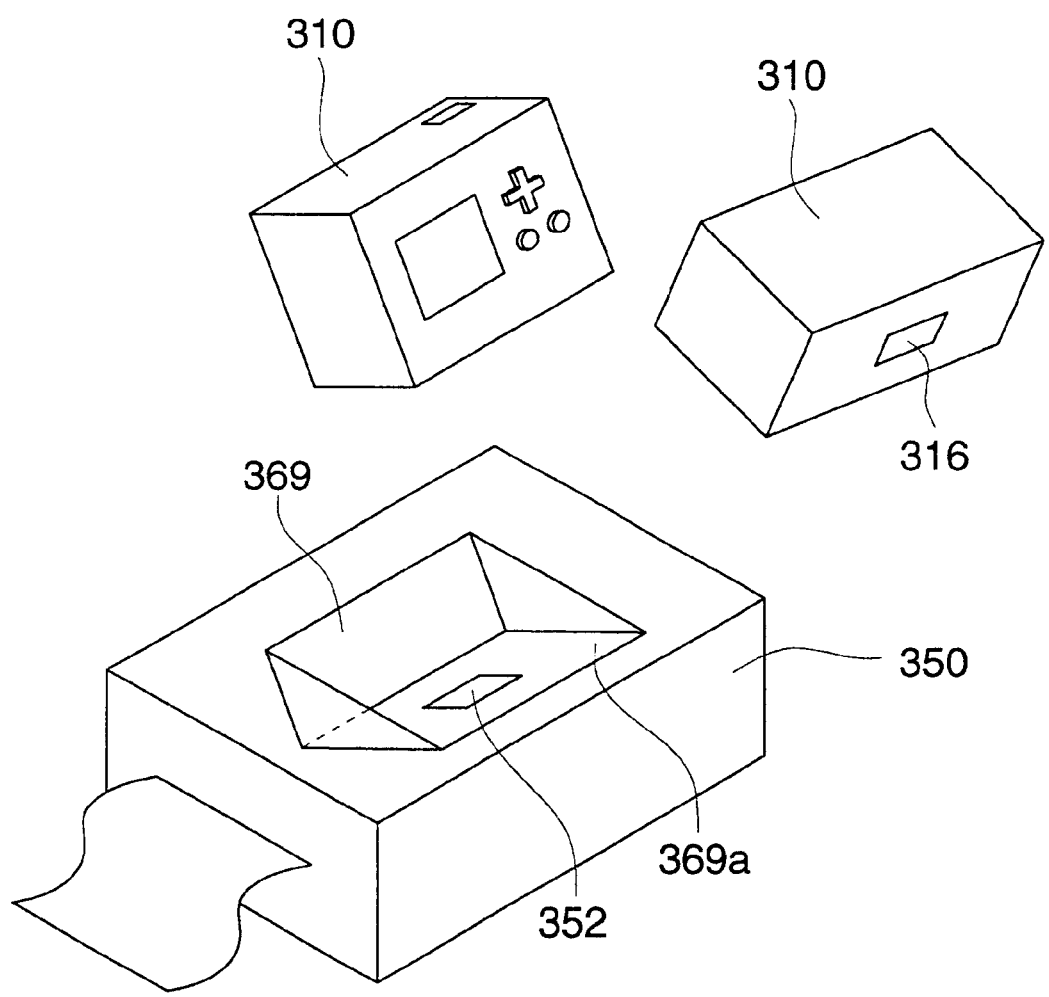
FIG. 15 is a perspective view showing the image capturing and printing apparatus according to the fourth embodiment.

FIG. 15 is a perspective view showing the image capturing and printing apparatus according to the fourth embodiment. Because the basic structure is the same as the structure of the above described embodiments, the different point will be mainly described. In FIG. 15, the electronic camera section 310 forms a communication port 316 of an IrDA communication apparatus as the I/F on the lower surface. On the one hand, the print section 350 forms a triangular engagement receiving portion 369 on the upper surface, and on its one slope 369a, forms a communication port 352 of the IrDA communication apparatus.

When the electronic camera section 310 is placed on the engagement receiving section 369 of the print section 350, it is held at a stable position (that is, mechanical engagement position) in which it is held on both slopes by the self weight, and in this position, because the communication port 316 of the IrDA communication apparatus of the electronic camera section 310 is opposite to the communication port 352 of the IrDA communication apparatus of the print section 350, by emitting the infrared ray by the well-known mode, the image signal or the information can be communicated.

According to the present embodiment, because the IrDA communication apparatus to wirelessly conduct information communication, is provided, for sending and receiving the image signal or the like, it is not necessary to electrically connect between the electronic camera section 310 and the print section 350 by wiring, thereby, the trouble such as the imperfect contact can be prevented, and the more user friendly structure can be provided.

Incidentally, in the above described embodiments, in order to provide the more user friendly structure, it is preferable that, for example, by only pressing the release button, the print is automatically outputted.

Figure 16:
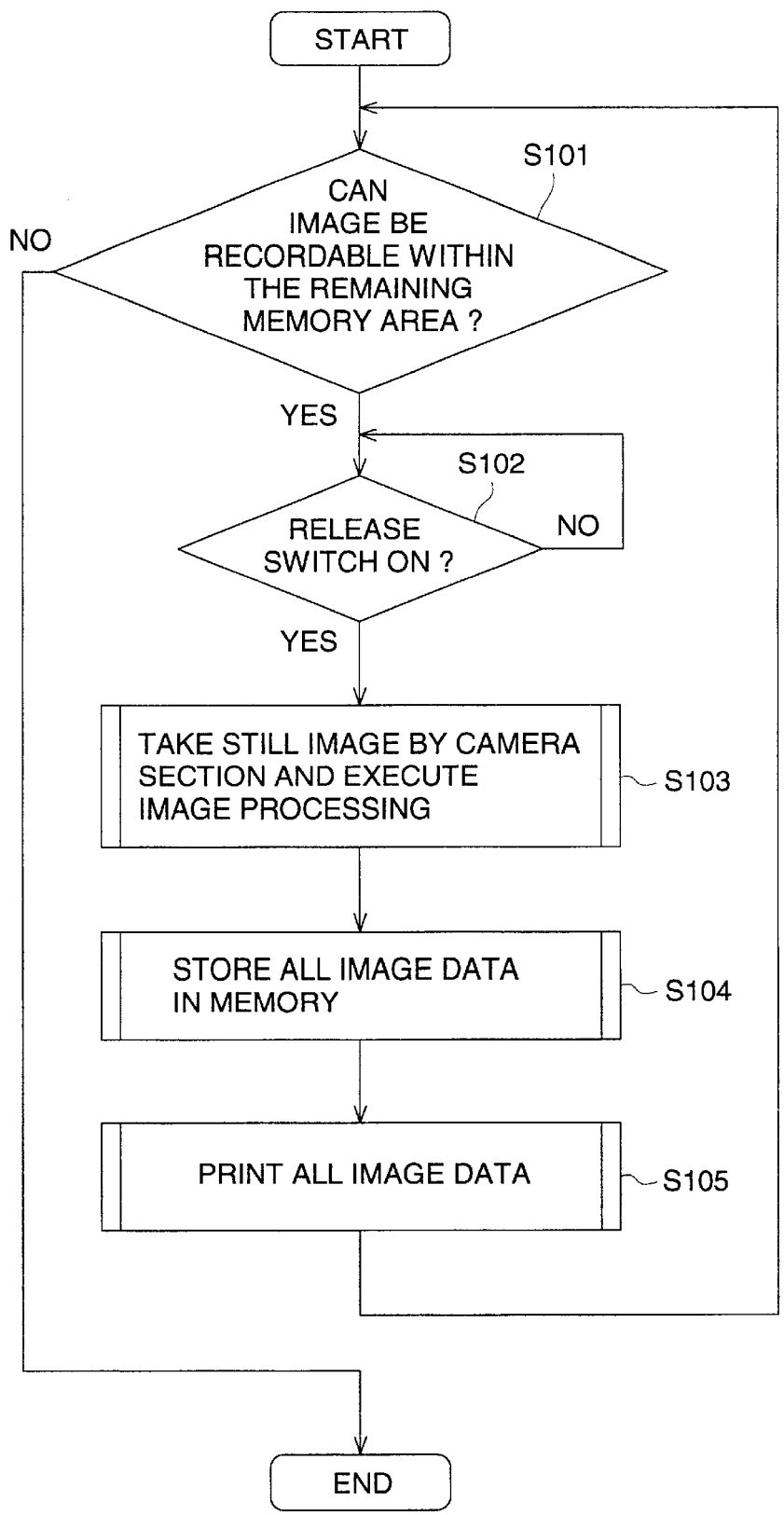
FIG. 16 is a flow chart showing the operation of the fourth embodiment by which such the operation can be conducted.
Figure 17:
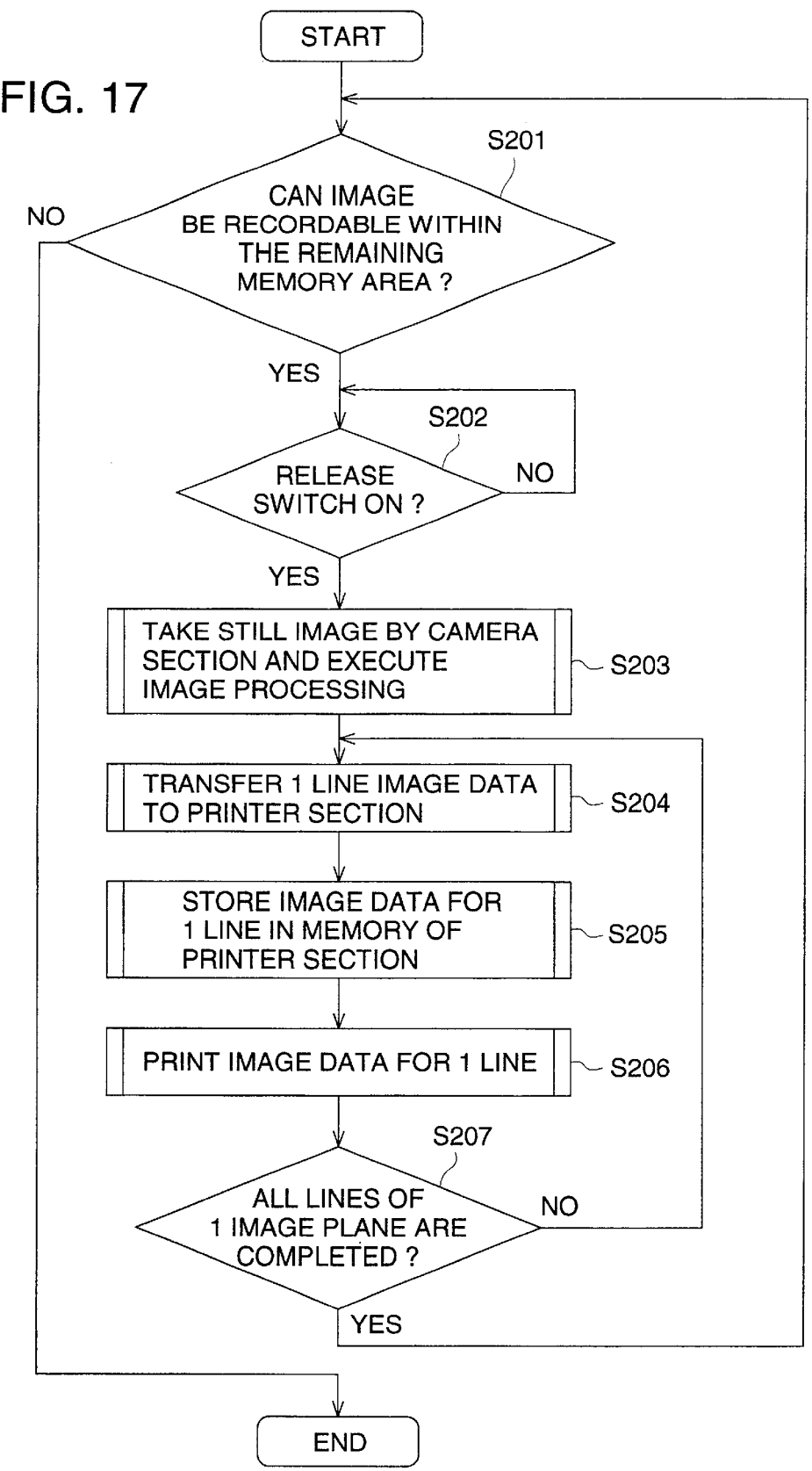
FIG. 17 is a flow chart showing the operation of the modification example.

FIGS. 16 and 17 are flow charts showing the fourth embodiment by which such the operation can be conducted. In step S101 in FIG. 16, the remaining amount of the memory of the electronic camera section or the remaining amount of the memory is compared, and it is judged whether or not the next image capturing is possible within the remaining memory, and when the remaining memory amount is insufficient, it is judged to be out of the possible number of image capturing, then the control flow is ended. On the one hand, when it is judged to be within the possible number of image capturing, the sequence waits for the release signal in the next step S102.

When the release switch is operated to turn ON, in step S103, the image capturing is conducted by the camera section, and the image processing is appropriately conducted.

In step S104, the still image data is stored in the memory of the electronic camera section or the print section, and in the next step S105, the print section reads out the image data stored in the memory and conducts the printing. After that, the control flow returns to step S101.

On the one hand, as the modified example of this, an example in which the storing and printing are conducted in parallel to each other by time division, is shown in FIG. 17. In step S201 in FIG. 17, the remaining amount of the memory of the electronic camera section or the remaining amount of the memory of the print section is compared, and it is judged whether or not the next image capturing is possible within the number of remaining memory, and when the remaining memory amount is insufficient, it is judged to be out of the possible number of image capturing, and the control flow is ended. On the one hand, when it is judged to be within the possible number of image capturing, the sequence waits the release signal in the next step S202.

When release switch is operated to turn ON, in step S203, the camera section conducts photographing, and appropriately conducts image processing.

In step S204, the still image data for 1 line is transmitted to the print section, and in the next step S205, the image data for 1 line is stored in the memory of the print section. Further, in step S206, the image data for 1 line stored in the memory is read out, and the print for 1 line is conducted. In step S207, it is judged whether the data storage and print for 1 image plane are completed, and when these are completed for 1 image plane, after that, the control flow returns to step S201.

In the embodiment shown in FIG. 16, after the still image data is stored, printing is conducted, however, it is of course that, after the print of the still image is previously conducted, the still image data may be stored.

Incidentally, the setting of the number of print sheets, resolution, and print size, may be conducted when, initially, the power supply is turned ON. In the setting, the final values when the previous operation is conducted, are stored, and these may be used as default values. Of course, before the photographing is conducted by the camera, these values may be changed to desired new setting values.

Further, it is also considered to provide the selection switch by which the function in which printing is conducted being interlocked with the release, is made invalid. Further, the strobe, self timer, and date function may be provided or may not be provided, however, it is convenient that the tripod seat is provided.

According to the present embodiment, because the photographing of the photographic object image, storing of the image signal, and printing is conducted corresponding to the release of the electronic camera section, for example, it is not necessary to specifically operate something but for the release means, and because the print can be obtained at the place at which the photographic object image is captured, the propriety of the image can be judged at once, and the image capturing can be conducted again. Further, because the image signal is saved, even when it is temporarily, a plurality of sheets of the same print can be obtained.

As above, referring to the embodiments, the present invention is described, however, the present invention is not to be interpreted to limit to the above embodiments, but, it is of course that change and improvement are possible. For example, as explained in the following embodiment, structures such as viewers and a pint producing apparatus and methods of using and processing image data and processing condition data can be used in appropriate combination.

Figure 19:
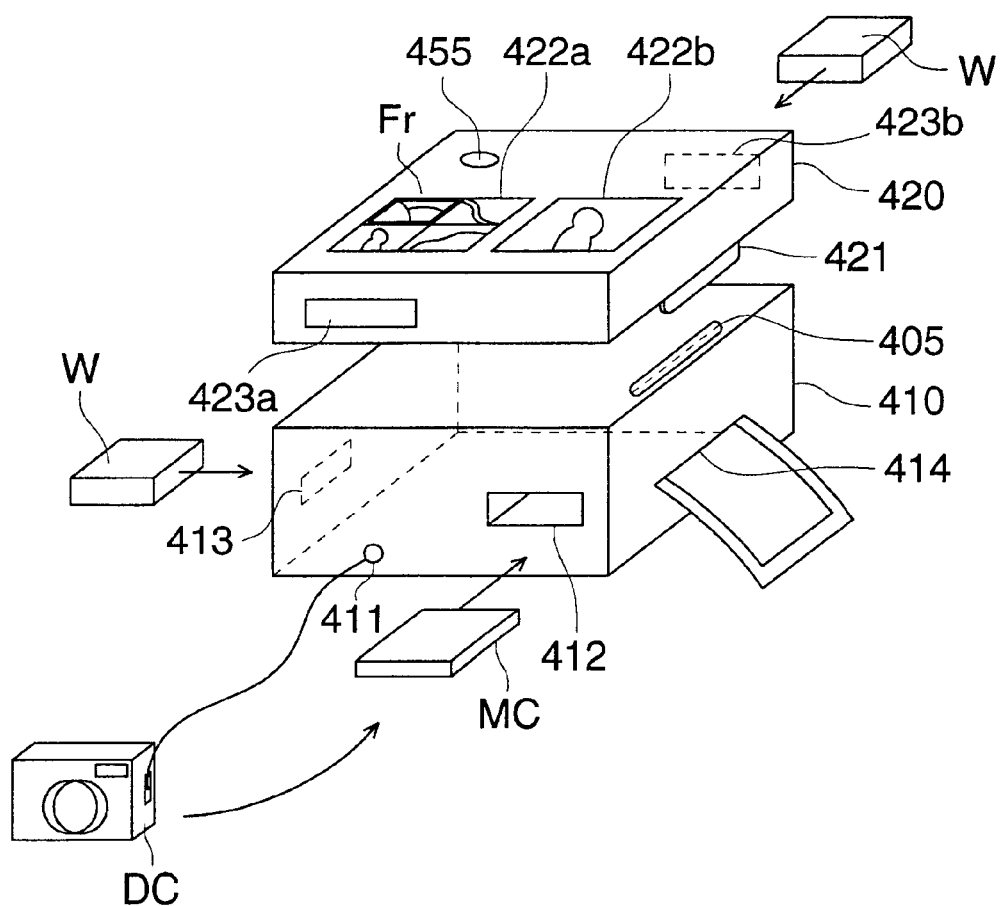
FIG. 19 is a perspective view showing a print producing apparatus according to the fifth embodiment.
Figure 20:
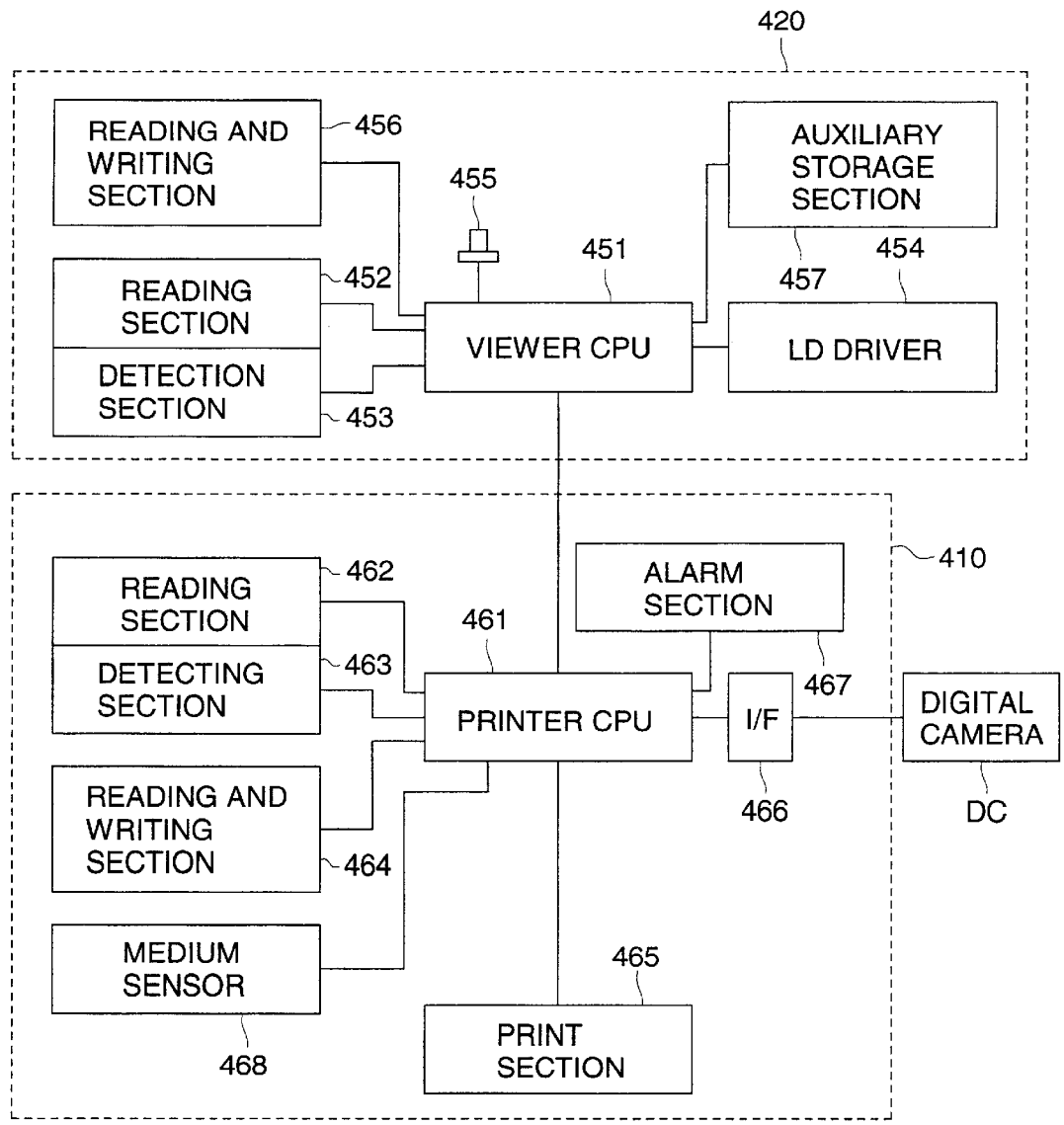
FIG. 20 is a block diagram of the print producing apparatus according to the present embodiment.

FIG. 19 is a perspective view showing a print producing apparatus according to the fifth embodiment. FIG. 20 is a block diagram of the print producing apparatus according to the present embodiment. In FIG. 19, the print producing apparatus 410 has a terminal 411 to receive the connection cable to a digital still camera DC on its front surface, and a receiving slot 412 of a memory card MC in which the image data obtained by the image capturing by the digital still camera DC, is stored.

Further, the print producing apparatus 410 has a receiving slot 413 of the storage medium W for the data writing on the left side, and a print delivery port 414 on the right side. On the one hand, the print producing apparatus 410 forms a pin type female connector 405 on its upper surface.

A viewer 420 having the dimensions of approximately the liquid crystal display section of the note type personal computer, has a male connector 421 on its lower surface, and by connecting both connectors 405 and 421 to each other, the viewer 420 is attached to the print producing apparatus 410 so that the signal can be supplied and received to and from each other.

Further, in the viewer 420, 2 liquid crystal image planes 422a and 422b (which are touch panel types) are arranged on its upper surface, and the viewer 420 has a receiving slot 423a of the memory card MC in which the image data obtained by the photographing by the digital still camera DC, is stored on its front surface, and a receiving slot 423b of the writable storage medium W on its rear surface.

In FIG. 20, the printer CPU 461 of the print producing apparatus 410 is shown in the condition that it is connected to the viewer 420 through connectors 405 and 421, and further, it is connected to a reading apparatus 462 provided in the receiving slot 412, a detection apparatus 463, a reading and writing apparatus 464, a printing apparatus 465, an interface 466, and an alarm apparatus 467, and it can control these apparatus.

On the one hand, a viewer CPU 451 is connected to a reading apparatus 452 provided in the receiving slot 23, a detection apparatus 453 of the memory card MC, an LD driver 454, a reading and writing apparatus 456, and an auxiliary storage apparatus 457, and it can control these apparatus.

Next, the operation of the present embodiment will be described. The viewer 420 can be separated from the print producing apparatus 410, and can be used at the out door by using the internal battery. For example, when the image captured by the digital still camera DC is confirmed, because the liquid crystal image plane provided to the digital still camera is small, it is difficult to confirm the image. In contrast to this, according to the present embodiment, by using the viewer 420 having the large display image planes 422a and 422b, the image can be more easily confirmed. Further, it can be used in combination with the electronic camera section described in the first to third embodiments. That is, this embodiment can also be made to be a modified example of the print section in the first to third embodiments.

More specifically, when the memory card MC is inserted into the receiving slot 423a of the viewer 420, and pushed to the readable position, the detection apparatus 453 detects it, and transmits the detection signal to the viewer CPU 451. In this case, the viewer CPU 451 drives the reading apparatus 452 and reads out the image data stored in the memory card MC, and displays the image on the liquid crystal image planes 422a and 422b through the LD driver 454. In such the case, even when the operator does not specially conduct the operation for the display, because, by only inserting the memory card MC into the slot 423a, the images corresponding to all stored image data are automatically displayed in a sight base, the confirmation of the image can be easily conducted. Further, for example, one sheet of the panorama image can be displayed ranging over 2 liquid crystal image planes 422a and 422b.

Incidentally, it may be allowable that a selection button 455 for the number of sheets of images is provided, and every time when it is pressed, the number of sheets of images displayed at one time can be changed. Alternatively, it may also be allowed that the operator presses the touch panel type liquid crystal image plane 422a (or 422b), and can specify the specific image. In such the case, it is preferable that the thumbnail images are displayed in a sight base on the liquid crystal image plane 422a, and the specified image is enlarged and displayed on the liquid crystal image plane 422b. Further, the viewer CPU 451 drives the LD driver, and may change the color of the frame Fr of the specified image, or may also attach the characters depending on the cases.

On the one hand, it is also possible that, independently of the operation of the operator, the viewer CPU 451 drives the LD driver 454, and the color of the frame Fr of the image with the latest capturing date as the first sheet of image, or the image with the oldest capturing date is changed, or the characters are attached. Thereby, when the operator confirms the image, the first or the last of the arranged images can be confirmed at a glance, and it is convenient. Incidentally, the dubbing of the image data may also be possible by using the viewer 420. In this case, under the control of the viewer CPU 451, the image data of the memory card MC inserted into the receiving slot 423a is read by the reading apparatus 452, and the read image data is written into the recording medium W inserted into the receiving slot 423b through the reading and writing apparatus 456. Further, the data stored in the storage medium W can also be read through the reading and writing apparatus 456. The auxiliary storage apparatus 457 is used for a temporary stock or the saving of the color management information under the control of the viewer CPU 451.

In the case where the print is conducted by using the print producing apparatus 410, when the memory card MC is inserted into the receiving slot 412, and pushed to the readable position, the detection apparatus 463 detects it, and transmits the detection signal to the printer CPU 461. In this case, the printer CPU 461 drives the reading apparatus 462, and reads out the image data stored in the memory card MC, and prints the image by the printing apparatus 465, and outputs it from the print delivery port 414. In such the case, even when the operator does not specially conduct the operation for the print formation, by only inserting the memory card MC into the slot 412, because the images corresponding to all the stored image data are printed, the print formation of the image can be easily conducted.

Herein, when the viewer 420 is connected to the print producing apparatus 410 and integrated with together, the images are displayed in a sight base by the viewer 420 according to the image data read from the memory card MC, and the images displayed in a sight base are automatically printed by the print producing apparatus 410. Incidentally, by pressing the image displayed on the touch panel type liquid crystal image planes 422a and 422b, for the specific image, the print of the number of sheets coincident with the number of pressing may be conducted. In that case, it is more preferable when the number of sheets of the print is displayed on the corresponding image.

Figure 21:
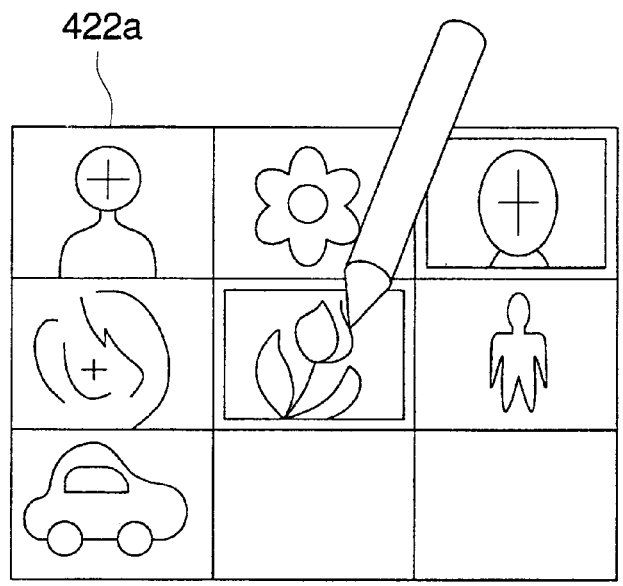
FIGS. 21(a) and 21(b) are illustrations showing a touch panel type liquid crystal screen.
Figure 21:
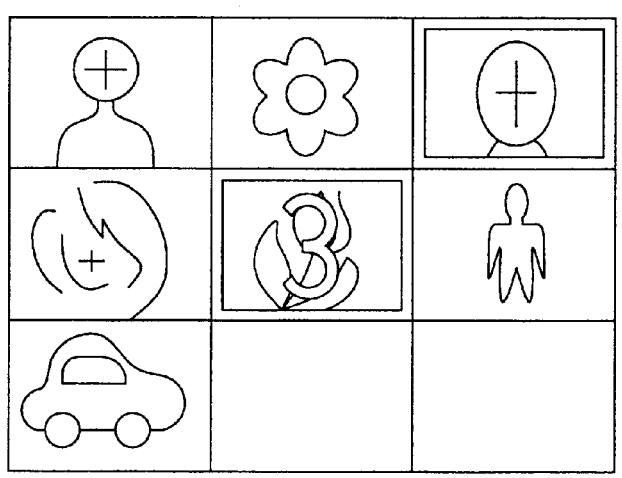

More concretely, as shown in FIG. 21(a), in the case that a print for a center image is desired among all images displayed in the same screen, the center image on the touch panel type liquid crystal screen 422a is pressed by the required number of prints. Here, in FIG. 21(b), the case that three prints are desired is show as an example. That is, the number (three: the number of prints) pressed on the touch panel is indicated on the selected center image. Then, information regarding the indicated number of prints and the selected image is outputted to the print producing apparatus 410, and the print producing apparatus conducts printing automatically based on this information.

Incidentally, because the image characteristic such as the color, is delicately different for each of kinds of the digital still cameras, in order to print the image at the optimum image quality, it is necessary that the image data is corrected according to the color management information (for example, the processing condition data such as the color conversion table) different for each of kinds of cameras.

Accordingly, in the present embodiment, by reading the color management information from the digital still camera DC, and by correcting (image processing) the image data according to that, the image with the higher image quality can be formed. More specifically, because the name of kinds of products of digital still cameras is stored as the tag information in the memory card MC, the reading apparatus 462 reads it, and collates it with the look-up table (file), as the processing condition data, stored in the printer CPU 461, and corrects the image data according to the corresponding correction information. Incidentally, in the present embodiment, the processing condition data is stored as the look-up table, however, it is not limited to this, but it may be the information relating to the processing procedure as the processing condition.

Further, it is also considered that one sheet of the memory card MC is used between a plurality of digital still cameras. In such the case, the image data having the different color management information exists in the one sheet of memory card MC. Accordingly, in this case, the color management information is stored by being made to correspond to each of the image data, and when the image data is read by the reading apparatus 462, the optimum color management information is made to correspond to each of image data, thereby, the image with the higher image quality can be printed. Incidentally, the color management information to be stored corresponding to the image data may be the information in which the color management processing can be specified, and the print can be conducted by the information relating to the name of kinds of products of cameras, a lookup table (LUT), processing condition and processing procedure, or the like.

Incidentally, when a plurality of pieces of the same color management information exist, by selecting and using the latest information obtained by comparing the version information or filing date to each other, the more appropriate print formation can be conducted. Alternatively, it can also be considered that the older information is erased so that the plurality of pieces of the same color management information do not exist, and only the latest color management information is stored always, or the latest color management information is overwritten on the older information.

Further, the color management information is not previously stored in the printer CPU 461 and when it is stored in the storage medium W, this is inserted into the receiving slot 413, and by reading it by the reading and writing apparatus 464, it can also be appropriately used. According to this, because the latest color management information can also be used at any time, it is convenient.

It is preferable when the color management information itself can be printed (or displayed through the viewer 420) for the use of the operator. In such the case, it is more preferable that the color management information is printed (or displayed) together with the correspondent image, because their correspondence relationship becomes clear. As the color management information to be printed, the preparing date or version of the color management information, etc., can be listed.

On the one hand, when the printer CPU 461 judges from the transferred data that the storage medium W is inserted into the slot 412, or that the format type of the image data in the memory card MC which is inserted into the slot 412 is, for example, the BMP type, and not the JPEG type which can be used by the print producing apparatus 410, the printer CPU 461 can give a predetermined alarm (for example, by the voice, buzzer sound, or liquid crystal display of(because the data is different; the print can not be formed), etc.) through the alarm apparatus 467. Thereby, the operator can confirm that the incorrect memory card is inserted into the slot 412.

The printer CPU 461 can give a predetermined alarm in the same manner, when it judges from the transferred data that the memory card MC is inserted into the slot 413, or when the storage medium W inserted into the slot 413 is empty.

Incidentally, when the printer CPU 461 judges from the transferred data that the storage medium W is inserted into the slot 412 and the memory card MC is inserted into the slot 413, the printer CPU 461 can use these data by interchanging them with each other.

Incidentally, it is also considered that the print forming information to specify, for example, the dimensions, material, or surface processing, etc., is inputted by using the touch panel type liquid crystal image planes 422a and 422b. In this case, when the print forming medium such as the sheets loaded in the print producing apparatus 410, does not correspond to the inputted print forming information, the print becomes inadequate.

Accordingly, in the present embodiment, the medium sensor 468 detects the dimensions (Hi-vision, panorama size, etc.), material (sheet, print with a seal, etc.), surface processing (gloss, silk surface, etc.) of the print forming medium, or the like, and transmits it to the printer CPU 461, and when it does not coincide with the inputted print forming information, a predetermined alarm (the voice, sound, image display mode of the viewer 420 of (corresponding medium is not loaded), or the like) is given through the alarm apparatus 467, and it can be reported to the operator that the print is not appropriately conducted.

Incidentally, for example, concerning the image whose aspect ratio is largely different from the loaded print sheet, like as the panorama image, it may also be allowed that, by the selection of the operator, either one of print of the condition that the entire image is formed on one print sheet (accordingly, upper and lower portions are the grounding), or the condition that the image is separated into a plurality of sheets, can be selected. Further, the print forming medium loaded in the print producing apparatus 410 may be roll-like.

On the one hand, it is also considered that the print forming information is not inputted from the viewer 420, and for example, it is formed on the digital still camera side, and previously stored in the memory card MC or storage medium W. In this case, the printer CPU 461 can automatically print the image according to the image data and the print forming information, corresponding to the insertion of the memory card MC or storage medium W. Further, the printer CPU 461 may automatically print the print forming information for the confirmation by the operator.

Further, when the read print forming information does not have a predetermined format, the printer CPU 461 can inhibit the print according to such the print forming information, in order to prevent errors.

In addition to that, the printer CPU 461 can also automatically store the read print forming information in the built-in memory, and further, can also report the content to the operator by presenting the print forming information in a predetermined form, by ((the voice, sound, or automatic replay of thumbnail image and characters of the viewer 420 of (the print is conducted in the form of . . . . )). Incidentally, when the digital still camera DC is connected to the print producing apparatus 410, the printer CPU 461 uses the liquid crystal image plane of the digital still camera, and may cause it to conduct such the presentation.

Incidentally, there is a case in which it is desired to copy the image data obtained by the photographing by the digital still camera DC. In this case, according to the present embodiment, the following can be considered: when the memory card MC is inserted into the slot 412, and the storage medium W is inserted into the slot 413, under the control of the printer CPU 461, the reading apparatus 462 reads the data in the memory card MC, and the reading and writing apparatus 464 automatically writes the data in the storage medium W.

In this case, when the reading apparatus 462 is made to be a read only one, and the memory card MC is inserted into the slot 412 without fail, there is no-possibility that the image data, or the like, in the memory card MC is erased by mistake.

Incidentally, in the viewer 420, the following can be considered: when the storage medium W is inserted into slots 423a and 423b, under the control of the viewer CPU 451, the reading apparatus 452 reads the data in the storage medium W inserted into the slot 23a, and the reading and writing apparatus 456 automatically writes the data in the storage medium W inserted into the slot 423b.

In such the case, when the reading apparatus 452 is made to be a read only one, and the storage medium whose data is not desired to be erased, is positively inserted into the slot 423a, there is no possibility that the stored data, or the like, is erased by mistake.

Further, in the print producing apparatus 410, as the present embodiment, when two slots of the slot 412 and the slot 413 are provided, reading and writing are simultaneously conducted quickly, and further, when their arranged surfaces are different, the mistake that the memory card MC is loaded in the slot 413 side by mistake, can also be reduced.

Further, because both slots 412 and 413 are provided on the surfaces different from the print delivery port 414, the mistake that the memory card MC or the storage medium W is inserted into the print delivery port by mistake, can also be reduced to the utmost. Further, during the print delivery, the insertion and ejection of the memory card MC or the storage medium W can also be easily conducted. The print producing apparatus is preferable when it is reduced in the size and light weight, to the degree which can be carried, and its weight is preferably not larger than 200 g.

Incidentally, in the print producing apparatus 410 and viewer 420, in order to prevent the mixture of the data, when the read-out data is written, it is preferable that the data is separated, for example, for each memory card, or for each of kinds of products of the digital still cameras, by the directory, or the like.

Further, when the same memory card MC is inserted or ejected several times, in order to avoid that the same data is repeatedly stored, it can also be considered that, when the data read out by the initial insertion coincides with the data read out by the later insertion, the printer CPU 461 (or the viewer CPU 451) inhibits the writing of the later data.

Further, in the print producing apparatus 410 and viewer 420, while the copy is conducted, when a lock means for inhibiting the insertion-and ejection of the memory card MC or storage medium W (not shown, but, for example, a mechanism that the ejection button can not be pressed) is provided, it is preferable.

Incidentally, because the storage capacity of the storage medium W is comparatively smaller than that of the hard disk, when many strings of image data with high pixels are stored, there is a possibility that the empty data remaining amount is reduced at once. Therefore, it can also be considered that, into the slot 413, instead of the storage medium W, the modem card or LAN card, which has the function to automatically transmits a mail, the function to make access to the specific site, or the function to call a specific telephone number, or the like, is inserted. In such the case, because the print producing apparatus 410 can make access so as to be transmittable, to the large capacity server, or the like, from the modem card, or the like, through the network, public line, internet, etc., all the data to be stored, can be saved in the server, or the like. In the same manner, the system may be structured such that the modem card or LAN card is inserted into the slot 423b of the viewer 420, and the print producing apparatus 410 can also make access so as to be transmittable, to the large capacity server, or the like, from the modem card, or the like, through the network, public line, or internet, etc.

Figure 22:
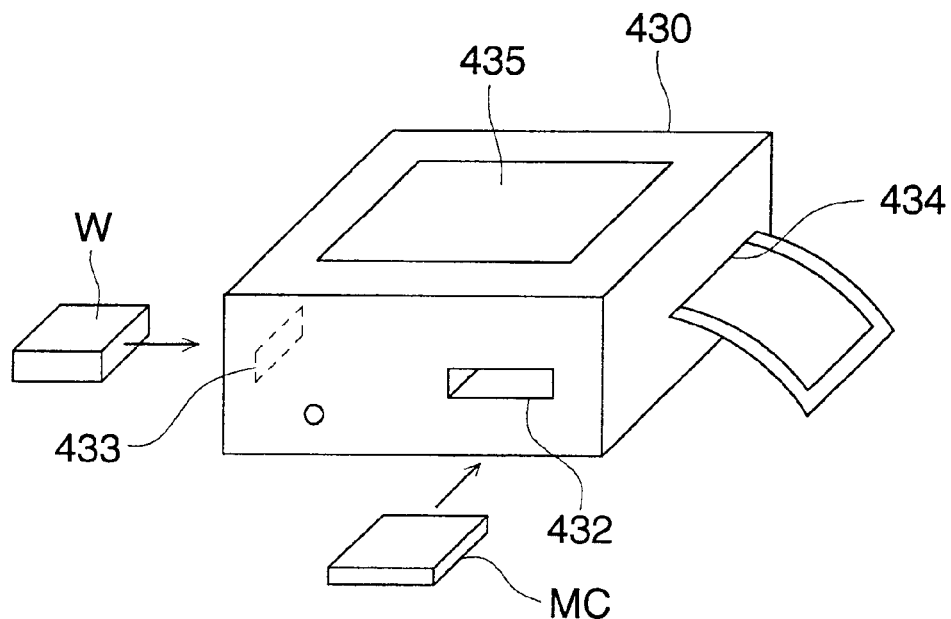
FIG. 22 is a perspective view showing the sixth embodiment.

FIG. 22 is a perspective view showing the sixth embodiment. In FIG. 22, the print producing apparatus 430 has the structure into which the print producing apparatus 410 and the viewer 420 in the first embodiment are integrated. That is, the print producing apparatus 430 has a terminal 431 to receive the connection cable to the digital still camera DC, and a receiving slot 432 of the memory card MC in which the image data obtained by image capturing by the digital still camera DC is stored, on the front surface.

Further, the print producing apparatus 430 has a receiving slot 433 of the storage medium W for data writing on the left side, and a print delivery port 434 on the right side. On the one hand, the print producing apparatus 430 arranges the liquid crystal image plane (preferably, touch panel type) on its upper surface.

The sixth embodiment has the structure in which the viewer and the print producing apparatus are integrated, and accordingly, because its operation is basically the same as the fifth embodiment, the description will be omitted.

Figure 23:
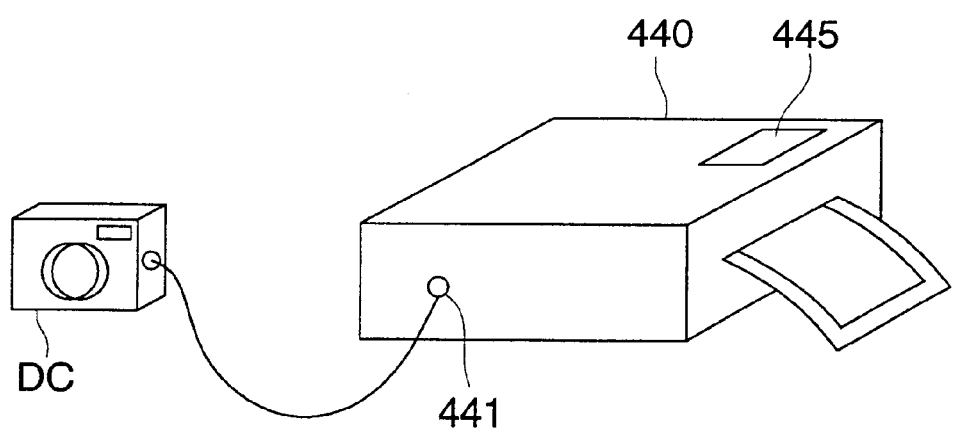
FIG. 23 is a perspective view showing the seventh embodiment.

FIG. 23 is a perspective view showing the seventh embodiment. In FIG. 22, because the print producing apparatus 440 does not have comparatively expensive liquid crystal image plane, which is different from the sixth embodiment, its cost is the more reduced. However, a reflection type liquid crystal panel 445 is arranged on the upper surface so that a simple alarm or the error number can be displayed.

The print producing apparatus 440 is structured such that it can conduct the designation of the print of the image or display of the alarm from the digital still camera DC, connected by the cable through the terminal 441, instead of that the print producing apparatus 440 does not have the operation panel or display image plane. That is, in the case where the print is desired, when the operator uses the operation button on the digital still camera DC side, and specifies the number of sheets of the print, or the like, the print producing apparatus 440 replies the data such as the image to be printed and the number of sheets, for confirmation.

According to the data, because the image to be printed and the number of sheets, or the like, are displayed on the liquid crystal image plane (not shown) of the digital still camera DC, when the operator presses the confirmation button (not shown) on the digital still camera DC side, the print is started. Incidentally, each kind of alarm is displayed by the liquid crystal image plane 445 of the print producing apparatus 440, however, because the more detailed data is transmitted to the digital still camera DC side, thereby, the operator can know the content of the alarm.

As described above, the present invention is described referring to the embodiments, however, the present invention is not to be construed limited to the above embodiments, but, it is of course that changes and improvements can be appropriately conducted. For example, the communication between the digital still camera and the print producing apparatus is not limited to through the cable, but, through the wireless communication means such as the IrDA, or by directly attaching the digital still camera to the print producing apparatus, the communication may be conducted.

According to of the present invention, the printing can be easily conducted without depending on the photographing place, while the portability is being secured.

According to the print producing apparatus of the present invention, the print can be more easily formed.

What is claimed is:

1. An image capturing and printing apparatus, comprising:
    an electronic camera section having image capturing means for photographing an object image to be photographed so as to convert the photographed object image into image signals;
    a printing section structured so as to be detachably attached to the electronic camera section and having a printer for conducting printing based on the image signals received from the electronic camera section; and
    the electronic camera section having
        an engaging section adapted to mechanically engages with the printing section, and
        a connecting section adapted to electrically connect with the printing section,
    wherein the electronic camera section comprises first release means and the printing section comprises second release means, an engageable section to be engaged with the engaging section of the electronic camera section and a connectable section to be electrically connected with the connecting section of the electronic camera section, and wherein the image capturing means starts photographing in response to a start signal from one of the first release means and the second release means, and
    wherein when the image capturing means starts photographing in response to the start signal from the one of the first release means and the second release means, the image capturing means does not work in response to a start signal from the other one of the first release means and the second release means for at least a predetermined period of time.

2. The image capturing and printing apparatus of claim 1, wherein while the printer conduct printing, the image capturing means does not work in response to the start signal from both of the first release means and the second release means.

3. The image capturing and printing apparatus of claim 1, wherein when the electronic camera section is electrically connected to the printing section through the connecting section, the image capturing means works in response to the start signal from one of the first release means and the second release means.

4. The image capturing and printing apparatus of claim 1, further comprising
    selecting means for selecting one of the first release means and the second release means and for relaying the start signal from the selected one.

5. The image capturing and printing apparatus of claim 1, wherein the printing section comprises an engageable section to be engaged with the engaging section of the electronic camera section, a connectable section to be electrically connected with the connecting section of the electronic camera section and one of a strobe and a mounting section for mounting a strobe.

6. The image capturing and printing apparatus of claim 1, wherein the electronic camera section comprises release means and the printing section comprises an engageable section to be engaged with the engaging section of the electronic camera section and a connectable section to be electrically connected with the connecting section of the electronic camera section, and wherein in response to a start signal from the release means, the electronic camera section conducts photographing and the printing section conducts memorizing the image signals in a memory and printing.

7. The image capturing and printing apparatus of claim 6, wherein the printing section conducts printing after memorizing the image signals in the memory.

8. The image capturing and printing apparatus of claim 6, wherein the printing section conducts printing while memorizing the image signals in the memory.

9. An image capturing and printing apparatus, comprising:
    an electronic camera section having image capturing means for photographing a object image to be photographed so as to convert the photographed object image into image signals;
    a printing section structured so as to be detachably attached to the electronic camera section and having a printer for conducting printing based on the image signals received from the electronic camera section; and
    the electronic camera section having
        an engaging section adapted to mechanically engages with the printing section, and
        a connecting section adapted to electrically connect with the printing section,
    wherein the electronic camera section comprises a first memory to store the image signals and the printing section comprises a second memory to store the image signals received from the electronic camera section and conducts printing based on the image signals, and
    wherein the printing section comprises an engageable section to be engaged with the engaging section of the electronic camera section and a connectable section to be electrically connected with the connecting section, and
    wherein the printing section further comprises comparing means for comparing a memory capacity of the second memory with a memory amount for the image signals converted by the electronic camera section and a controller to control the electronic camera section such that when the memory capacity of the second memory is smaller than the memory amount for the image signals, the electronic camera section sends image signals to the printing section preferentially from an index image indicating screen on which plural index images reduced in image size are indicated.

10. The image capturing and printing apparatus of claim 9, wherein the index image indicating screen is structured so as to indicate at least two kinds of images and character information including a frame number other than the images.

11. An image capturing and printing apparatus, comprising:
- an electronic camera section having image capturing means for photographing a object image to be photographed so as to convert the photographed object image into image signals;
- a printing section structured so as to be detachably attached to the electronic camera section and having a printer for conducting printing based on the image signals received from the electronic camera section; and
- the electronic camera section having
   - an engaging section adapted to mechanically engages with the printing section, and
   - a connecting section adapted to electrically connect with the printing section,
- wherein the electronic camera section comprises transmitting means for transmitting image size information of the image before transmitting the image signals, and the printing section comprises an engageable section to be engaged with the engaging section of the electronic camera section and a connectable section to be electrically connected with the connecting section.

12. The image capturing and printing apparatus of claim 11, wherein the printing section has alarm means for judging whether or not a size of a recording sheet set on the printer is proper on the basis of the image size received from the transmitting means and for giving an alarm when judging it as inproper.

13. The image capturing and printing apparatus of claim 11, wherein the electronic camera section comprises a processor for processing the image signals on the basis of at least two of a print image resolution, a print image size and a number of pixels of the printer and the transmitting means transmits the image signals processed by the processor to the printing sections.

14. The image capturing and printing apparatus of claim 11, wherein the electronic camera section comprises a processor for processing the image signals so as to form a plurality of ranks different in image resolution, and the transmitting means transmits image signals in proper ranks based on at least two of a print image resolution, a print image size and a number of pixels to the printing section.

15. An image capturing and printing apparatus, comprising:
- an electronic camera section having image capturing means for photographing a object image to be photographed so as to convert the photographed object image into image signals;
- a printing section structured so as to be detachably attached to the electronic camera section and having a printer for conducting printing based on the image signals received from the electronic camera section; and
- the electronic camera section having
   - an engaging section adapted to mechanically engages with the printing section, and
   - a connecting section adapted to electrically connect with the printing section, wherein the electronic camera section comprises a first memory to store the image signals and the printing section comprises a second memory to store the image signals received from the electronic camera section, and wherein the image signals are selectively stored in either the first memory or the second memory, and
- further comprising comparing/selecting means for comparing a remaining memory capacity of the first memory with that of the second memory, for selecting one having the larger remaining memory capacity, and storing the image signals in the selected one.

16. The image capturing and printing apparatus of claim 15, further comprising selecting means for selecting one of the first memory and the second memory, for storing the image signal in the selected one, selecting the other one when the remaining memory capacity of the previously selected one becomes smaller than a predetermined memory amount, and storing the image signals in the selected other one.

17. The image capturing and printing apparatus of claim 15, further comprising an operating member to select one of the first memory and the second memory and the image signals are stored in the selected one.

18. The image capturing and printing apparatus of claim 15, further comprising alarm means for comparing a remaining memory capacity of each of the first memory and the second memory with a predetermined value and for giving alarm when the remaining memory capacity is lower than the predetermined value.

19. The image capturing and printing apparatus of claim 18, wherein the alarm means includes output means for transmitting an alarm by using at least one of sound, light, and oscillation.

20. The image capturing and printing apparatus of claim 19, wherein the output means is provided to one of the electronic camera section and the printing section.

21. An image capturing and printing apparatus, comprising:
- an electronic camera section having image capturing means for photographing a object image to be photographed so as to convert the photographed object image into image signals;
- a printing section structured so as to be detachably attached to the electronic camera section and having a printer for conducting printing based on the image signals received from the electronic camera section; and
- the electronic camera section having
   - an engaging section adapted to mechanically engages with the printing section, and
   - a connecting section adapted to electrically connect with the printing section,
- wherein the printing section comprises an engageable section to be engaged with the engaging section of the electronic camera section and a connectable section to be electrically connected with the connecting section of the electronic camera section, and the electronic camera section comprises a detachable power source and a lid through which the detachable power source is incorporated in the electronic camera section, and wherein the lid is provided on a surface of an engaging side of the electronic camera section at which the electronic camera section and the printing section are engaged.

22. The image capturing and printing apparatus of claim 21, wherein the electronic camera section comprises a first slot and a second slot through which a detachable memory is incorporated and the printing section comprises an engageable section to be engaged with the engaging section of the electronic camera section and a connectable section to be electrically connected with the connecting section of the electronic camera section, and wherein the first slot is provided on a surface of an engaging side of the electronic camera section at which the electronic camera section and the printing section are engaged and the second slot is provided on a surface other than the surface of the engaging side.

23. An image capturing and printing apparatus, comprising:
an electronic camera section having image capturing means for photographing a object image to be photographed so as to convert the photographed object image into image signals;
a printing section structured so as to be detachably attached to the electronic camera section and having a printer for conducting printing based on the image signals received from the electronic camera section; and
the electronic camera section having
an engaging section adapted to mechanically engages with the printing section, and
a connecting section adapted to electrically connect with the printing section,
wherein the electronic camera section comprises a case and the printing section comprises an engageable section to be engaged with the engaging section of the electronic camera section and a connectable section to be electrically connected with the connecting section of the electronic camera section, and wherein the engaging section is provided so as to be shiftable in one direction relatively to the cases
wherein the engaging section is movable two-dimensionally on a surface of an engaging side of the case and further rotatable around an axis perpendicular to the surface of the engaging side.

24. An image capturing and printing apparatus, comprising:
an electronic camera section having image capturing means for photographing a object image to be photographed so as to convert the photographed object image into image signals;
a printing section structured so as to be detachably attached to the electronic camera section and having printer for conducting printing based on the image signals received from the electronic camera section;
the electronic camera section having
an engaging section adapted to mechanically engages with the printing section, and
first communicating means provided on a surface of an engaging side of the electronic camera section and for transmitting information to or receiving information from the printing section by wireless; and
the printing section having
an engageable section to be engaged with the engaging section of the electronic camera section, and
second communicating means provided on a surface of an engaging side of the printing section and for transmitting information to or receiving information from the electronic camera section by wireless,
wherein the electronic camera section receives an electric power through a wire from the printing section.

25. An image capturing and printing apparatus, comprising:
an electronic camera section having image capturing means for photographing a object image to be photographed so as to convert the photographed object image into image signals;
a printing section structured so as to be detachably attached to the electronic camera section and having a printer for conducting printing based on the image signals received from the electronic camera section; and
the electronic camera section having
an engaging section adapted to mechanically engages with the printing section, and
a connecting section adapted to electrically connect with the printing section,
wherein the electronic camera section comprises a processor to process the image signals converted by the image capturing means and a second connecting section to electrically connect with an external device and the printing section comprises an engageable section to be engaged with the engaging section of the electronic camera section and a connectable section to be electrically connected with the connecting section of the electronic camera section, and wherein the electronic camera section comprises detecting means for detecting which one of the external device and the printing section is connected and the electronic camera section changes a content of the processing by the processor in accordance with a detection result of the detecting means.

26. The image capturing and printing apparatus of claim 25, wherein the changed processing is one of image processing and data format conversion.

27. The image capturing and printing apparatus of claim 25, wherein the first connecting section and the second connecting section are electrically coupled to a common section.

28. The image capturing and printing apparatus of claim 25, wherein the electronic camera section has an operating section, and when it is judged from the detection result that the electronic camera section is connected to the printing section, the operating section is allowed to conduct a predetermined operation, or when it is judged from the detection result that the electronic camera section is connected to the external device, the operating section is inhibited to conduct a predetermined operation.

29. The image capturing and printing apparatus of claim 30, wherein the electronic camera section has an operating section, and when it is judged from the detection result that the printing section is connected to the electronic camera section, the operating section is allowed to conduct a predetermined operation, or when it is judged from the detection result that the printing section is connected to the external device, the operating section is inhibited to conduct a predetermined operation in the printing section.

30. An image capturing and printing apparatus, comprising:
an electronic camera section having image capturing means for photographing a object image to be photographed so as to convert the photographed object image into image signals;
a printing section structured so as to be detachably attached to the electronic camera section and having a printer for conducting printing based on the image signals received from the electronic camera section; and
the electronic camera section having
an engaging section adapted to mechanically engages with the printing section, and
a connecting section adapted to electrically connect with the printing section,
wherein the printing section comprises a device controller to control the electronic camera section and an external device different from the electronic camera section, an engageable section to be engaged with the engaging section of the electronic camera section, a first connectable section to be electrically connected with the connecting section of the electronic camera section, and a second connectable section to be electrically connected with the external device, and wherein the printing section comprises detecting means for detecting which one of the electronic camera section and the external device is connected and the printing section changes a content of the processing by the device controller in accordance with a detection result of the detecting means.

31. The image capturing and printing apparatus of claim 30, wherein the changed processing by the device controller is at least one of input/output image processing, data format, a command system, and an image size.

32. The image capturing and printing apparatus of claim 30, wherein the first connecting section and the second connecting section are electrically coupled to a common section.

* * * * *